(12) United States Patent
Takamura et al.

(10) Patent No.: US 10,586,445 B2
(45) Date of Patent: *Mar. 10, 2020

(54) INFORMATION PROCESSING APPARATUS FOR CONTROLLING TO EXECUTE A JOB USED FOR MANUFACTURING A PRODUCT

(71) Applicant: Sony Corporation, Tokyo (JP)

(72) Inventors: Seiichi Takamura, Saitama (JP); Yasuharu Asano, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/223,137

(22) Filed: Dec. 18, 2018

(65) Prior Publication Data

US 2019/0122537 A1 Apr. 25, 2019

Related U.S. Application Data

(63) Continuation of application No. 15/914,860, filed on Mar. 7, 2018, now Pat. No. 10,217,351, which is a
(Continued)

(30) Foreign Application Priority Data

Jun. 1, 2012 (JP) ................................ 2012-126051

(51) Int. Cl.
*H04B 3/36* (2006.01)
*G08B 31/00* (2006.01)
(Continued)

(52) U.S. Cl.
CPC ............. *G08B 31/00* (2013.01); *G06Q 50/01* (2013.01); *H04L 67/22* (2013.01); *H04M 1/72563* (2013.01); *H04M 2250/12* (2013.01)

(58) Field of Classification Search
CPC ........................ G08B 31/00; H04M 1/72563
(Continued)

(56) References Cited

U.S. PATENT DOCUMENTS 6,434,525 B1 8/2002 Nagisa et al.
6,940,407 B2 9/2005 Miranda-Knapp et al.
(Continued)

FOREIGN PATENT DOCUMENTS

JP 11-203006 A 7/1999
JP 2007-41923 A 2/2007
(Continued)

OTHER PUBLICATIONS

Japanese Office Action dated Dec. 15, 2015 in Patent Application No. 2012-126051 (without English Translation).

*Primary Examiner* — Tai T Nguyen
(74) *Attorney, Agent, or Firm* — Xsensus, LLP

(57) ABSTRACT

There is provided an information processing apparatus including a matter extracting unit extracting a predetermined matter from text information, an action pattern specifying unit specifying one or multiple action patterns associated with the predetermined matter, an action extracting unit extracting each of the action patterns associated with the predetermined matter, from sensor information, and a state analyzing unit generating state information indicating a state related to the matter, based on each of the action patterns extracted from the sensor information, using a contribution level indicating a degree of contribution of each of the action patterns to the predetermined matter, for a combination of the predetermined matter and each of the action patterns associated with the predetermined matter.

13 Claims, 31 Drawing Sheets

Related U.S. Application Data continuation of application No. 15/453,508, filed on Mar. 8, 2017, now Pat. No. 9,978,259, which is a continuation of application No. 14/613,825, filed on Feb. 4, 2015, now Pat. No. 9,619,998, which is a continuation of application No. 13/858,297, filed on Apr. 8, 2013, now Pat. No. 8,981,941.

(51) Int. Cl.
  *G06Q 50/00* (2012.01)
  *H04L 29/08* (2006.01)
  *H04M 1/725* (2006.01)

(58) Field of Classification Search
  USPC .................. 340/573, 407.1, 407.2, 517, 521
  See application file for complete search history.

(56) References Cited

U.S. PATENT DOCUMENTS

| | | | |
|---|---|---|---|
| 7,050,907 | B1 | 5/2006 | Janky et al. |
| 7,333,604 | B2 | 2/2008 | Zernovizky et al. |
| 8,044,818 | B2 | 10/2011 | Tysowski et al. |
| 8,830,176 | B2 | 9/2014 | Bos et al. |
| 8,836,502 | B2 | 9/2014 | Culbert et al. |
| 2002/0111794 | A1 | 8/2002 | Yamamoto et al. |
| 2007/0112922 | A1* | 5/2007 | Kurata .............. H04M 1/72563 709/206 |
| 2010/0146433 | A1 | 6/2010 | Murata et al. |
| 2011/0264691 | A1 | 10/2011 | Migita et al. |
| 2012/0209533 | A1* | 8/2012 | Kodama ............... A61B 5/1118 702/19 |
| 2012/0216114 | A1 | 8/2012 | Privault et al. |
| 2013/0318021 | A1 | 11/2013 | Tateno et al. |
| 2013/0325959 | A1 | 12/2013 | Takamura et al. |
| 2015/0332565 | A1 | 11/2015 | Cho et al. |

FOREIGN PATENT DOCUMENTS

| | | |
|---|---|---|
| JP | 2007-304692 A | 11/2007 |
| JP | 2008-03655 A | 1/2008 |
| JP | 2010-41482 A | 2/2010 |
| JP | 2011-81431 A | 4/2011 |
| JP | 2011-198292 A | 10/2011 |
| JP | 2011-232871 A | 11/2011 |

* cited by examiner

FIG. 3

EXAMPLE OF MOTION/STATE PATTERN

| | MOTION PATTERN (INCLUDING POSTURE) | | STATE PATTERN (VEHICLE) |
|---|---|---|---|
| 1 | Walking (WALK) | 1 | Train (TRAIN) |
| 2 | Running (RUN) | 2 | Elevator (ELEVATOR) |
| 3 | Still (REST) | 3 | Car (CAR) |
| 4 | Pausing (PAUSE) | 4 | Bicycle (BICYCLE) |
| 5 | Jumping (JUMP) | ... | ... |
| 6 | Posture Changing (POSTURE CHANGE) | | |
| 7 | Turning (TURN) | | |
| ... | ... | | |

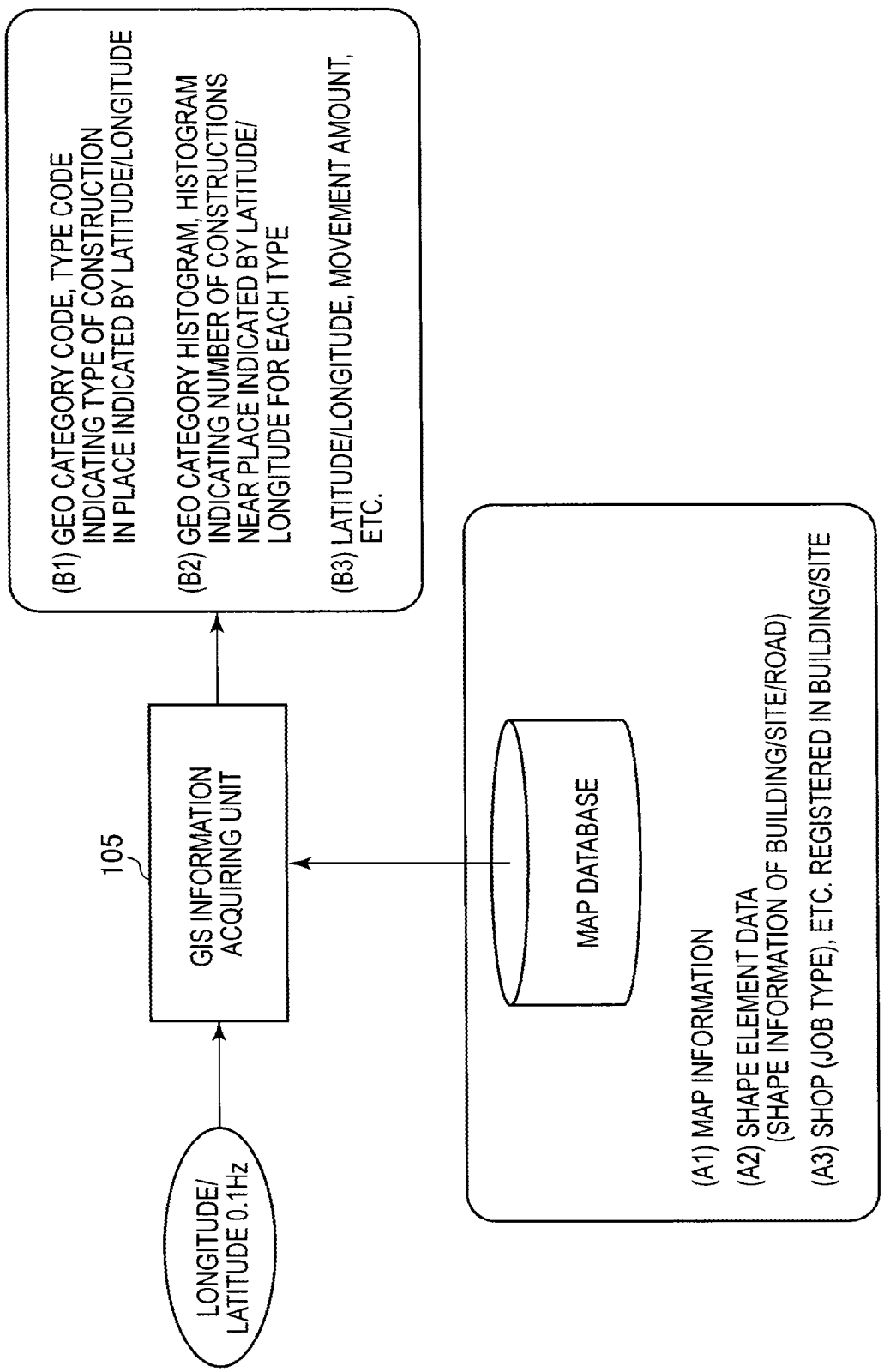

FIG. 5

| GEO CATEGORY | | | |
|---|---|---|---|
| LARGE CLASSIFICATION | NAME | MIDDLE CLASSIFICATION | NAME |
| 1000000 | ROAD/CAR-RELATED | 1001000 | EXPRESSWAY/URBAN EXPRESSWAY |
| | | 1002000 | PUBLIC HIGHWAY |
| | | 1003000 | GAS STATION |
| | | 1004000 | DRIVE-IN |
| | | 1005000 | PARKING AREA |
| 1100000 | TRAIN-RELATED | 1101000 | RAILROAD |
| | | 1102000 | SUBWAY |
| | | 1103000 | MONORAIL |
| | | 1104000 | CABLE CAR |
| | | 1105000 | ROPEWAY |
| | | 1106000 | LAND TRANSPORT SERVICE |
| 1200000 | AIRPORT-RELATED | 1201000 | AIRPORT/AIRFIELD |
| 1300000 | SPORTS FACILITY | 1301000 | GOLF COURSE |
| | | 1302000 | SKI AREA |
| | | 1303000 | CAMPSITE |
| | | 1304000 | BASEBALL GROUND |
| | | 1305000 | BATTING CENTER |
| 1400000 | AMUSEMENT FACILITY | 1401000 | MOVIE THEATER |
| | | 1402000 | THEATER/VAUDEVILLE THEATER |
| | | 1403000 | GAME CENTER |
| | | 1404000 | POOL HALL |
| | | 1405000 | GO/SHOGI AREA |
| ⋮ | ⋮ | ⋮ | ⋮ |

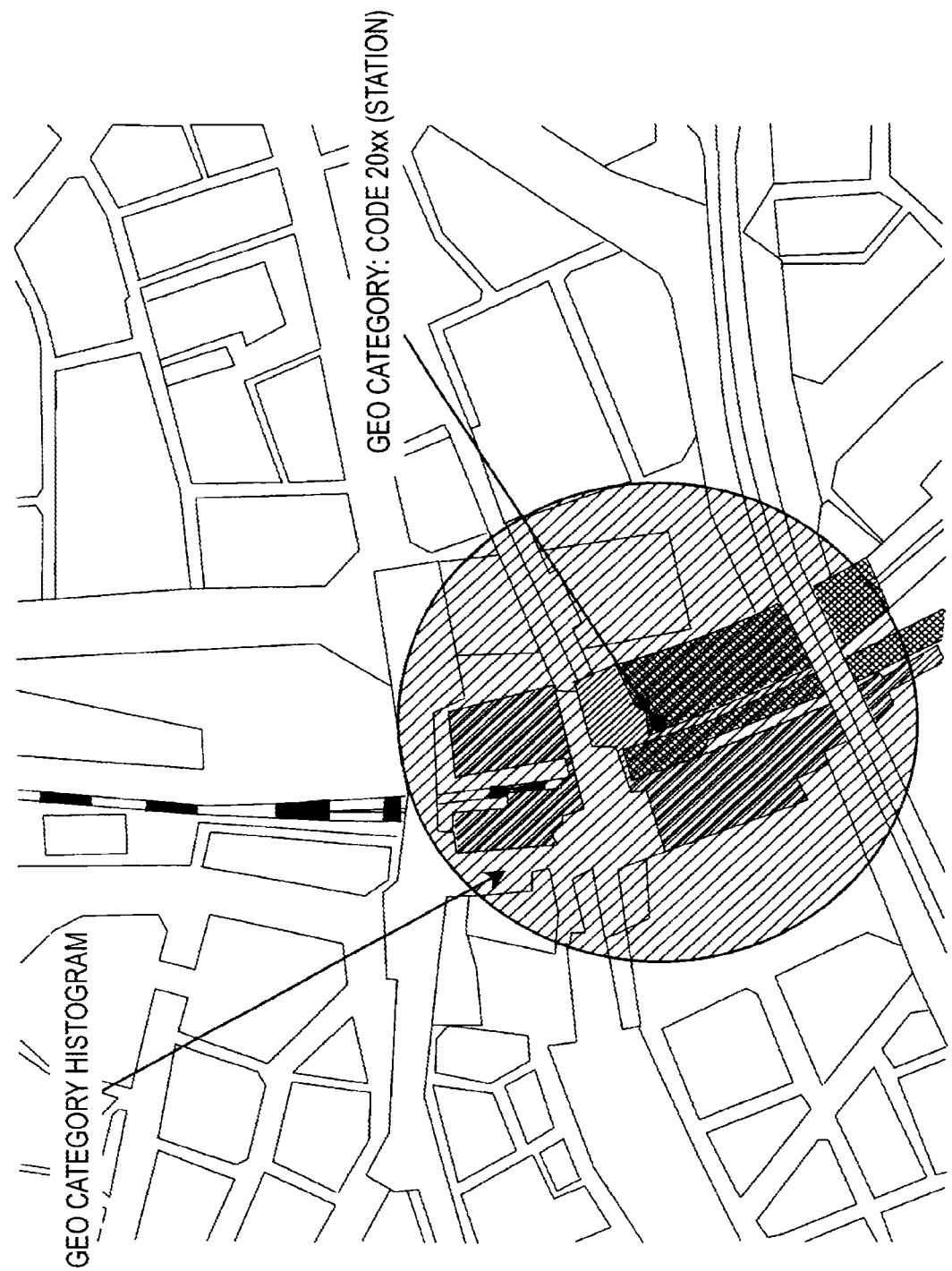

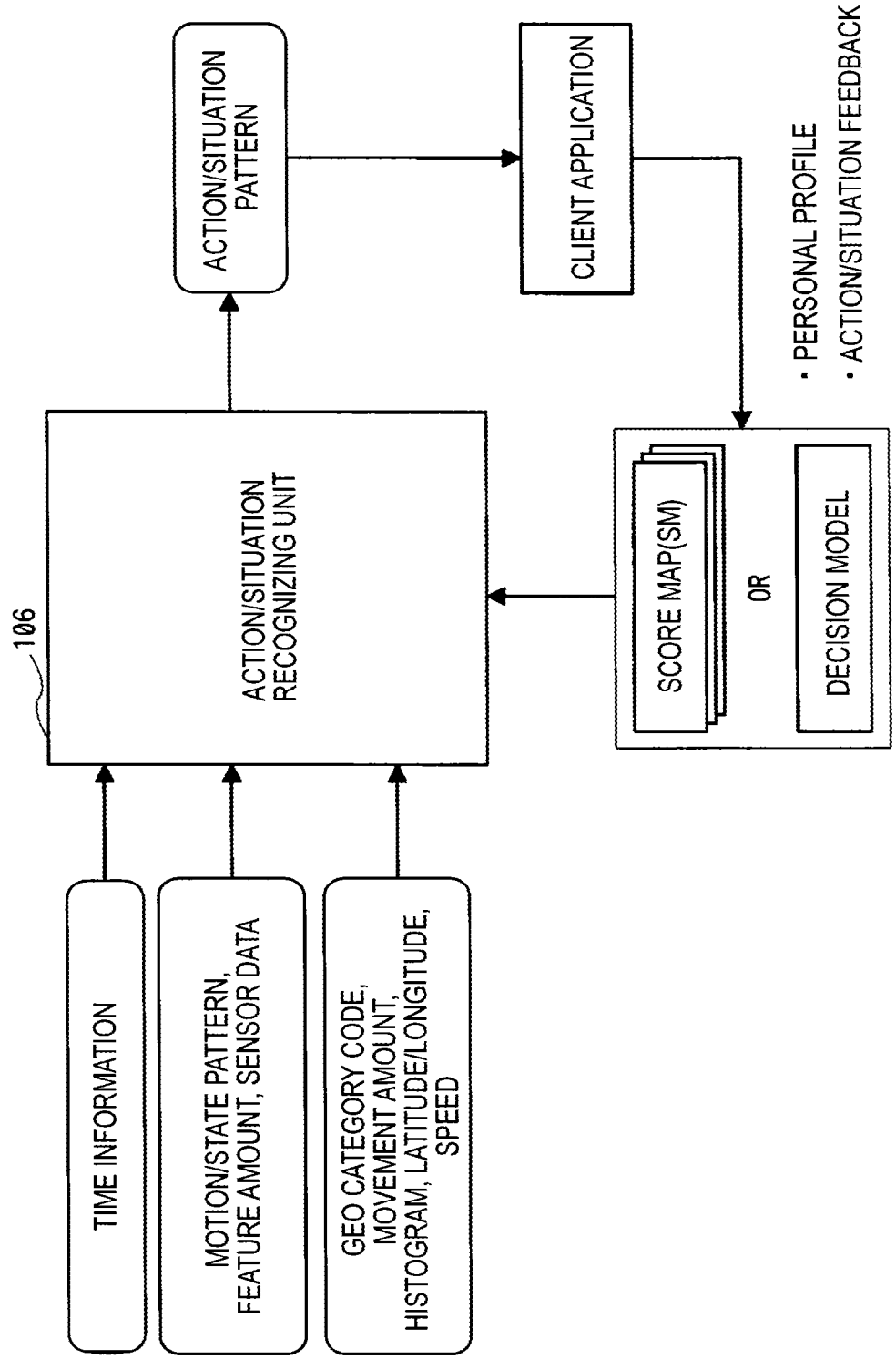

FIG. 9

| MIDDLE CLASSIFICATION | NAME | SPORTS | WALK | PLAY | SHOPPING | MUSICAL PERFOR-MANCE | OTHERS | HOUSE-WORK | EATING | LEARNING | OPERATION | VIEWING | SLEEP |
|---|---|---|---|---|---|---|---|---|---|---|---|---|---|
| 1501000 | MUSEUM, ART MUSEUM, MUSEUM OF SCIENCE | | 2 | | 2 | | | 1 | 1 | 3 | | 1 | |
| 1901000 | MEDICAL SERVICE (GENERAL HOSPITAL) | | 1 | | 2 | | 1 | 3 | 1 | 1 | | | |
| 1902000 | MEDICAL BUILDING | | 1 | | 2 | | 1 | 3 | 1 | 3 | | | |
| 2301000 | PRIVATE PREPARATORY SCHOOL/CRAM SCHOOL | | | | 1 | | | | | | | 1 | |
| 2302000 | KINDERGARTEN/NURSERY SCHOOL | 3 | | 1 | | 1 | | 2 | 1 | 3 | | | |
| 2303000 | ELEMENTARY SCHOOL | 3 | | 1 | | 1 | | 2 | 1 | 3 | | 1 | |
| 2304000 | SCHOOL FOR HANDICAPPED CHILDREN | 3 | | 1 | 1 | 1 | | 2 | 1 | 3 | | 1 | |
| 2305000 | TECHNICAL COLLEGE | 3 | | 1 | 1 | | | 2 | 1 | 3 | | 1 | |
| 1905000 | WORKPLACE | | | | | | | | 1 | 2 | 4 | | |
| 1801000 | INN/HOTEL | | 2 | | 1 | 1 | 1 | 2 | 1 | 3 | | 1 | |
| 8888888 | HOME | | | 1 | | | | 4 | 1 | 2 | | 1 | |
| 1502000 | LIBRARY | | | | 1 | | | 1 | 1 | 3 | | | |
| 1503000 | ASSEMBLY HALL/HALL | | | | | 1 | | 2 | 2 | 3 | | | |
| 1601000 | GREEN BELT | | 2 | 1 | | 1 | | 2 | 1 | 1 | | | |
| 1602000 | NATURAL AREA | | 2 | 1 | | 1 | | 2 | 1 | 1 | | | |

DECISION EXAMPLE OF OPERATION/STATE PATTERN

※ P1 TO P9: SCORE MAP GROUPS SM1 TO SM9 CORRESPONDING TO TIME/DAY

CALCULATION METHOD OF SCORE DISTRIBUTION USING MACHINE LEARNING

FIG. 13

| | | | | | | | | |
|---|---|---|---|---|---|---|---|---|
| 1 | SHOPPING | 3 | WALK | 7 | MOVEMENT | 8 | VIEWING |
| 101 | CONVENIENCE STORE | 301 | WALK WITH PET | 701 | WALK | 801 | MOVIE |
| 102 | CD/BOOKSTORE | 399 | OTHERS | 702 | TRAIN | 802 | MUSIC |
| 103 | TAILOR'S SHOP | | | 703 | BICYCLE | 803 | TELEVISION |
| 104 | DEPARTMENT STORE | 4 | EATING | 704 | CAR | ⋮ | ⋮ |
| 105 | MEGA MARKET | | | 705 | ELEVATOR | 899 | OTHERS |
| 106 | VENDING MACHINE | 5 | HOUSEWORK | 706 | SHIP | 9 | SPORT |
| ⋮ | ⋮ | 501 | CLEANING | 707 | MOVING SIDEWALK | 901 | MARATHON |
| | | | | 708 | ESCALATOR | 902 | GOLF |
| 199 | OTHERS | ⋮ | ⋮ | 709 | AIRPLANE | 903 | BASEBALL |
| | | 599 | OTHERS | 710 | BUS | 904 | SKI |
| 2 | WORK | | | ⋮ | ⋮ | ⋮ | ⋮ |
| 201 | HARD WORK | 6 | LEARNING | | | 999 | OTHERS |
| 202 | DESK WORK | 601 | LECTURE/ SEMINAR | 799 | OTHERS | ⋮ | ⋮ |
| ⋮ | ⋮ | ⋮ | ⋮ | | | 99 | OTHERS |
| 299 | OTHERS | 699 | OTHERS | | | | |

SYSTEM CONFIGURATION EXAMPLE

FIG. 19

EXAMPLE OF EXPERIENCE PLACE EXTRACTION

|  | MORPHEME | WORD CLASS | LABEL |
|---|---|---|---|
|  | BAITO | NOUN: GENERAL | O |
|  | MENSETSU | NOUN: CONJUNCTION OF CONJUGATION OF S-STEM VERB | O |
|  | OWAT | VERB: INDEPENDENT | O |
| [-2, *] | TE | PARTICLE: CONJUNCTIVE PARTICLE | O |
| [-1, *] | KYOTO | NOUN: PROPER NOUN | B - Where |
| [0, *] | EKI | NOUN: SUFFIX | I - Where |
| [1, *] | DE | PARTICLE: CASE PARTICLE | O |
| [2, *] | KURASHIKKU | NOUN: GENERAL | O |
|  | KII | VERB: INDEPENDENT | O |
|  | TERU | VERB: NON-INDEPENDENT | O |
|  | RUPAN | NOUN: GENERAL | O |
|  | ♪ | NOUN: CONJUNCTION OF CONJUGATION OF S-STEM VERB | O |

Above the table: [ *, 0 ]    [ *, 1 ]

FIG. 20

EXAMPLE OF GOAL/DECLARATION EXTRACTION

| | TEXT | EXPERIENCE TYPE | EXPERIENCE PLACE | EXPERIENCE TIME | GOAL/ DECLARATION |
|---|---|---|---|---|---|
| 1 | I WORK HARD ON DIETING FROM TODAY ! | DIETING | NOTHING | FUTURE | YES |
| 2 | [PR] POPULAR HEALTH FOOD FOR DIETING ! http://t.co/... | NOTHING | NOTHING | NOTHING | NO |
| 3 | DIETING ONLY BY SLEEPING IS FINISHED ♪ | DIETING | NOTHING | PAST | NO |
| 4 | DO I LOSE SOMEWHAT WEIGHT ? | NOTHING | NOTHING | NOTHING | NO |
| 5 | I WILL GET THIN | DIETING | NOTHING | FUTURE | YES |
| 6 | I RESOLVE TO GO TO BED EARLY AND GET UP EARLY FROM NOW ON | EARLY TO BED AND EARLY TO RISE | NOTHING | FUTURE | YES |
| 7 | I FAILED TO GO TO BED EARLY... I AM SLEEPY... | NOTHING | NOTHING | NOTHING | NO |

FIG. 21

CORRESPONDENCE RELATIONSHIP BETWEEN
GOAL/DECLARATION AND ACTION PATTERN

|   | GOAL/DECLARATION | ACTION PATTERN | CONTRIBUTION LEVEL |
|---|---|---|---|
| A | DIETING | WALK | MEDIUM |
| B | DIETING | RUN | HIGH |
| C | DIETING | RIDE BICYCLE | LOW |
| D | DIETING | GET IN CAR | NOTHING |
| E | DIETING | TAKE TRAIN | NOTHING |
| F | DIETING | GET ON BUS | NOTHING |
| G | EARLY TO BED AND EARLY TO RISE | GO TO BED AT BEDTIME | HIGH |
| H | EARLY TO BED AND EARLY TO RISE | GET UP AT WAKE-UP TIME | HIGH |
| I | EARLY TO BED AND EARLY TO RISE | WALK AT BEDTIME | NOTHING |
| J | EARLY TO BED AND EARLY TO RISE | GO TO BED AT WAKE-UP TIME | NOTHING |

FIG. 22
ATTAINMENT LEVEL OF GOAL/DECLARATION (DIETING)
|   | TIME AND DATE | ACTION PATTERN | DURATION TIME | ATTAINMENT LEVEL |
|---|---|---|---|---|
| 1 | 2012/01/23 08:00 | TAKE TRAIN | 1 h | -5 |
| 2 | 2012/01/23 09:00 | WALK | 10 min | 10 |
| 3 | 2012/01/23 19:00 | TAKE TRAIN | 1 h | 5 |
| 4 | 2012/01/23 21:00 | RUN | 30 min | 35 |
| 5 | 2012/01/24 08:00 | TAKE TRAIN | 1 h | 30 |
| 6 | 2012/01/24 19:00 | TAKE TRAIN | 1 h | 25 |
| 7 | 2012/01/25 08:00 | TAKE TRAIN | 1 h | 20 |
| 8 | 2012/01/25 19:00 | TAKE TRAIN | 1 h | 15 |
DISPLAY EXAMPLE #1
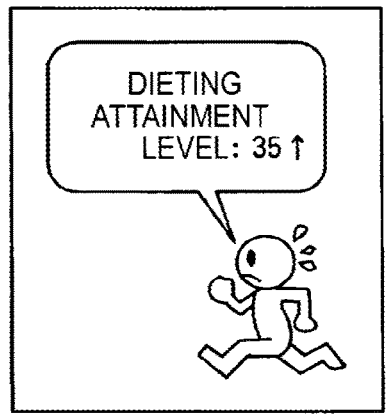
DISPLAY EXAMPLE #2
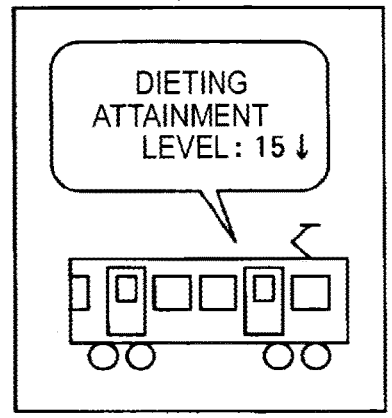

FIG. 25

CHECK OF ACTION AND EXPERIENCE

|   | ACTION | EXPERIENCE |
|---|---|---|
| A | SIT | EATING |
| B | SIT | WORK |
| C | WALK | TAKE WALK |
| D | RUN | GO TO WORK |
| E | RUN | DIETING |
| F | MOVE BY CAR | CONVERSATION |
| G | MOVE BY TRAIN | READING |

↑ FROM SENSOR INFORMATION     ↑ FROM TEXT INFORMATION

FIG. 26

SEARCH OF ADDITIONAL EXPERIENCE

| | TEXT | EXPERIENCE TYPE | EXPERIENCE PLACE | EXPERIENCE TIME | EXPERIENCE TARGET |
|---|---|---|---|---|---|
| 1 | I WORK HARD ON DIETING FROM TODAY! | DIETING | NOTHING | FUTURE | |
| 2 | I AM WALKING WITH DOG IN PARK | TAKE WALK | PARK | PRESENT | DOG |
| 3 | DIETING ONLY BY SLEEPING IS FINISHED ♪ | DIETING | NOTHING | PAST | |
| 4 | I AM GOING TO WORKPLACE IN RUSH... I AM LIKELY TO BE LATE... GOSH | GO TO WORK | NOTHING | PRESENT | |
| 5 | I WILL GET THIN | DIETING | NOTHING | FUTURE | |
| 6 | RESOLVE TO GO TO BED EARLY AND GET UP EARLY FROM NOW ON | EARLY TO BED AND EARLY TO RISE | NOTHING | FUTURE | |
| 7 | I PLAN TO GO ON DATE WITH FRIEND TONIGHT AT 8! | CONVERSATION | CAR | FUTURE | |

FIG. 30

| EXTRAORDINARY PATTERN | EXTRAORDINARY CONDITION | SPECIFIC EXAMPLE | ESTIMATED REASON |
|---|---|---|---|
| (EXTRAORDINARY #1), TIME ZONE ABNORMITY OCCURS IN ACTION EXTRACTED FROM SENSOR INFORMATION | IN CASE WHERE ACTION OF CERTAIN TYPE IS EXTRACTED IN TIME ZONE DIFFERENT FROM TIME ZONE IN WHICH IT IS ORDINARILY EXTRACTED OR IN CASE WHERE IT IS NOT EXTRACTED IN ANY TIME ZONES | IN CASE WHERE, ALTHOUGH "WALKING" ACTION IS ORDINARILY EXTRACTED IN MORNING AND EVENING, "WALKING" ACTION IS EXTRACTED AT MIDNIGHT, ETC. | INSOMNIA |
| (EXTRAORDINARY #2), TYPE ABNORMITY OCCURS IN ACTION EXTRACTED FROM SENSOR INFORMATION | IN CASE WHERE ACTION OF DIFFERENT TYPE FROM TYPE OF ACTION THAT IS ORDINARILY EXTRACTED IS EXTRACTED IN CERTAIN TIME ZONE | IN CASE WHERE, ALTHOUGH "WALKING" ACTION OR "TRAIN" ACTION IS ORDINARILY EXTRACTED IN MORNING, "RUNNING" ACTION OR "BICYCLE" ACTION IS EXTRACTED, ETC. | DIETING DURING COMMUTE TIME |
| (EXTRAORDINARY #3), TIME ZONE ABNORMITY OCCURS IN EXPERIENCE EXTRACTED FROM TEXT INFORMATION | IN CASE WHERE EXPERIENCE OF CERTAIN TYPE IS EXTRACTED IN TIME ZONE DIFFERENT FROM TIME ZONE IN WHICH IT IS ORDINARILY EXTRACTED OR IN CASE WHERE IT IS NOT EXTRACTED IN ANY TIME ZONES | IN CASE WHERE, ALTHOUGH "EATING" EXPERIENCE IS ORDINARILY EXTRACTED IN MORNING, AFTERNOON AND EVENING, "EATING" EXPERIENCE IS EXTRACTED AT MIDNIGHT OR "EATING" EXPERIENCE IS NOT EXTRACTED IN AFTERNOON, ETC. | BUSY AT WORK |
| (EXTRAORDINARY #4), TYPE ABNORMITY OCCURS IN EXPERIENCE EXTRACTED FROM TEXT INFORMATION | IN CASE WHERE EXPERIENCE OF DIFFERENT TYPE FROM TYPE OF EXPERIENCE THAT IS ORDINARILY EXTRACTED IS EXTRACTED IN CERTAIN TIME ZONE | IN CASE WHERE, ALTHOUGH "EATING" EXPERIENCE IS ORDINARILY EXTRACTED IN AFTERNOON, "RUNNING" EXPERIENCE IS EXTRACTED IN AFTERNOON, ETC. | DIETING BY SKIPPING LUNCH |

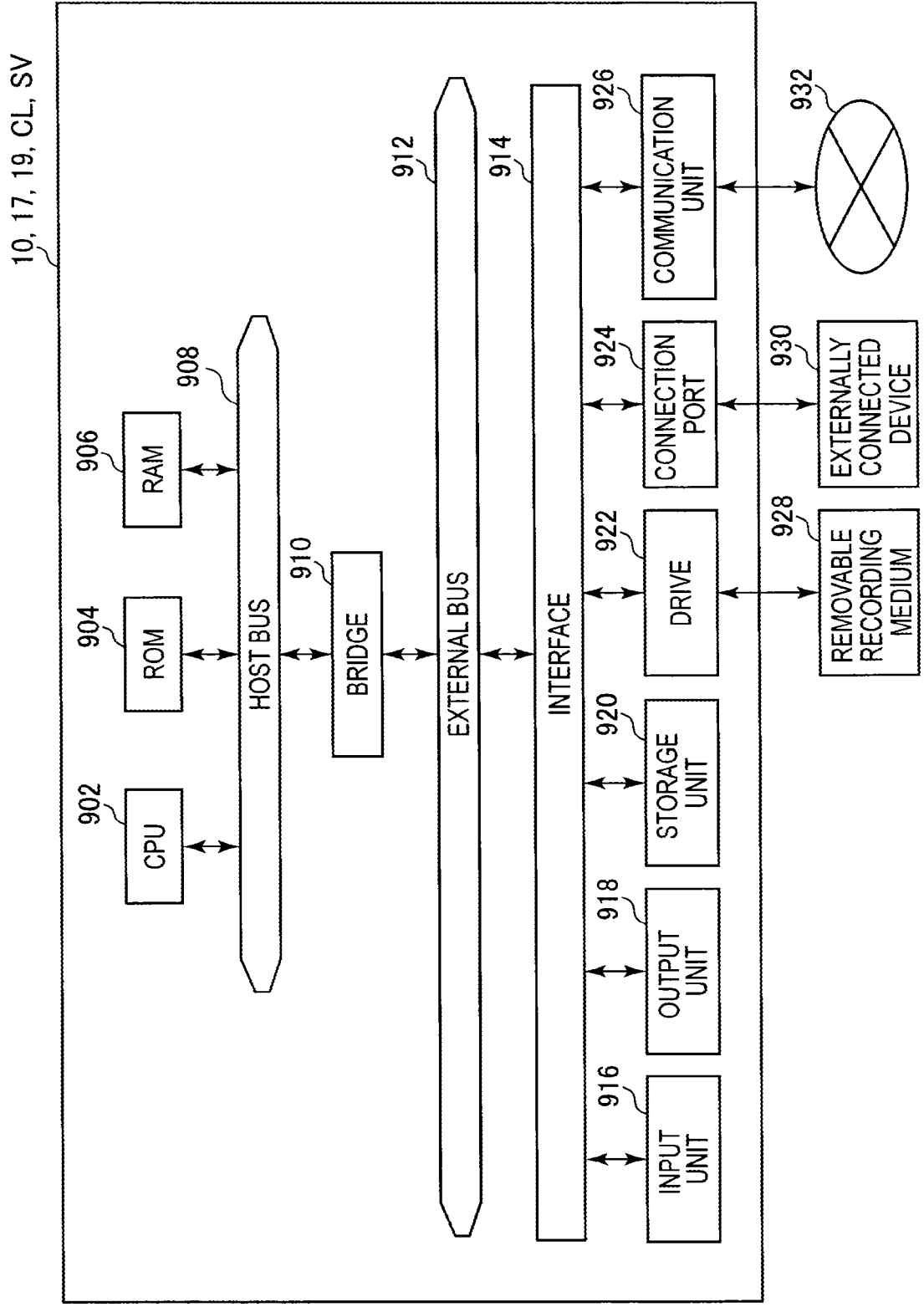

INFORMATION PROCESSING APPARATUS FOR CONTROLLING TO EXECUTE A JOB USED FOR MANUFACTURING A PRODUCT

CROSS-REFERENCE OF RELATED APPLICATIONS

This application is a continuation of U.S. application Ser. No. 15/914,860, filed Mar. 7, 2018, now patented as U.S. Pat. No. 10,217,351, which is a continuation of U.S. application Ser. No. 15/453,508, filed Mar. 8, 2017, now patented as U.S. Pat. No. 9,978,259, which is a continuation of U.S. application Ser. No. 14/613,825, filed Feb. 4, 2015, now patented as U.S. Pat. No. 9,619,998, which is a continuation of U.S. application Ser. No. 13/858,297, filed Apr. 8, 2013, now patented as U.S. Pat. No. 8,981,941, which is based upon and claims benefit of priority from Prior Japanese Patent Application No. 2012-126051, filed Jun. 1, 2012, the entire contents of all of which are incorporated herein by reference.

BACKGROUND

The present disclosure relates to an information processing apparatus, an information processing method and a program.

It is focused on a technique of mounting a motion sensor on a mobile terminal such as a mobile phone and automatically detecting and recording a use action history. For example, following Japanese Patent Laid-Open No. 2008-003655 discloses a technique of using a motion sensor such as an acceleration sensor and a gyro sensor and detecting a walking operation, a running operation, a right-turning and left-turning operation and a still state. The patent literature discloses a method of calculating a walking pitch, walking power and a rotation angle from output data of the motion sensor and detecting the walking operation, the running operation, the right-turning and left-turning operation and the still state using the calculation result.

Further, the patent literature discloses a method of detecting a user's action pattern by statistical processing with an input of operation and state patterns such as the types of these operations and state, the period of time during which the operations and the state continue and the number of operations. By using the above method, it is possible to acquire an action pattern such as "sauntering" and "restless operation" as time-series data. However, the action pattern acquired in this method mainly indicates a user's operation and state performed in a relatively short period of time. Therefore, it is difficult to estimate, from an action pattern history, specific action content such as "I shopped at a department store today" and "I ate at a hotel restaurant yesterday."

The action pattern acquired using the method disclosed in following Japanese Patent Laid-Open No. 2008-003655 denotes an accumulation of actions performed in a relatively period of time. Also, individual actions themselves forming the action pattern are not intentionally performed by the user. By contrast, specific action content is intentionally performed by the user in most cases and is highly entertaining, which is performed over a relatively long period of time. Therefore, it is difficult to estimate the above specific action content from an accumulation of actions performed during a short period of time. However, recently, there is developed a technique of detecting a highly-entertaining action pattern performed over a relatively long period of time, from an action pattern in a relatively short period of time acquired using a motion sensor (see following Japanese Patent Laid-Open No. 2011-081431).

SUMMARY

Meanwhile, recently, a network environment surrounding users become sophisticated and diversified, and social network services have become common, which upload a comment input by the user to a server on a network. Such a comment may include information related to a user's action or intention.

The present disclosure is considered in view of such a condition and intends to provide a new improved information processing apparatus, information processing method and program that can provide higher level information by combining an action pattern recognition result based on information acquired from a position sensor or motion sensor and other information than the information acquired form the position sensor or motion sensor.

According to an embodiment of the present disclosure, there is provided an information processing apparatus including a matter extracting unit extracting a predetermined matter from text information, an action pattern specifying unit specifying one or multiple action patterns associated with the predetermined matter, an action extracting unit extracting each of the action patterns associated with the predetermined matter, from sensor information, and a state analyzing unit generating state information indicating a state related to the predetermined matter, based on each of the action patterns extracted from the sensor information, using a contribution level indicating a degree of contribution of each of the action patterns to the predetermined matter, for a combination of the predetermined matter and each of the action patterns associated with the predetermined matter.

According to an embodiment of the present disclosure, there is provided an information processing method including extracting a predetermined matter from text information, specifying one or multiple action patterns associated with the predetermined matter, extracting each of the action patterns associated with the predetermined matter, from sensor information, and generating state information indicating a state related to the predetermined matter, based on each of the action patterns extracted from the sensor information, using a contribution level indicating a degree of contribution of each of the action patterns to the predetermined matter, for a combination of the predetermined matter and each of the action patterns associated with the predetermined matter.

According to an embodiment of the present disclosure, there is provided a program for causing a computer to realize a matter extracting function of extracting a predetermined matter from text information, an action pattern specifying function of specifying one or multiple action patterns associated with the predetermined matter, an action extracting function of extracting each of the action patterns associated with the predetermined matter, from sensor information, and a state analyzing function of generating state information indicating a state related to the matter, based on each of the action patterns extracted from the sensor information, using a contribution level indicating a degree of contribution of each of the action patterns to the predetermined matter, for a combination of the predetermined matter and each of the action patterns associated with the predetermined matter.

According to the embodiments of present disclosure described above, it is possible to provide higher level information by combining an action pattern recognition result based on information acquired from a position sensor or motion sensor and other information than the information acquired form the position sensor or motion sensor.

BRIEF DESCRIPTION OF THE DRAWINGS

FIG. 3 is an explanatory diagram for explaining a function of a motion/state recognizing unit;

FIG. 4 is an explanatory diagram for explaining a function of a GIS information acquiring unit:

FIG. 5 is an explanatory diagram for explaining a function of a GIS information acquiring unit;

FIG. 7 is an explanatory diagram for explaining a function of a GIS information acquiring unit:

FIG. 8 is an explanatory diagram for explaining a function of an action/situation recognizing unit;

FIG. 9 is an explanatory diagram for explaining a function of an action/situation recognizing unit;

FIG. 13 is an explanatory diagram for explaining an example of a detected action/situation pattern;

FIG. 19 is an explanatory diagram for explaining details of a function of an information provision system according to configuration example #1;

FIG. 20 is an explanatory diagram for explaining details of a function of an information provision system according to configuration example #1;

FIG. 21 is an explanatory diagram for explaining details of a function of an information provision system according to configuration example #1;

FIG. 22 is an explanatory diagram for explaining details of a function of an information provision system according to configuration example #1;

FIG. 25 is an explanatory diagram for explaining details of a function of an information provision system according to configuration example #2;

FIG. 26 is an explanatory diagram for explaining details of a function of an information provision system according to configuration example #2;

FIG. 30 is an explanatory diagram for explaining details of a function and decision operation of an information provision system according to configuration example #3; and FIG. 31 is an explanatory diagram for explaining a hardware configuration example that can realize the functions of a system and each device according to the embodiment.

DETAILED DESCRIPTION OF THE EMBODIMENT(S)

Figure 1:
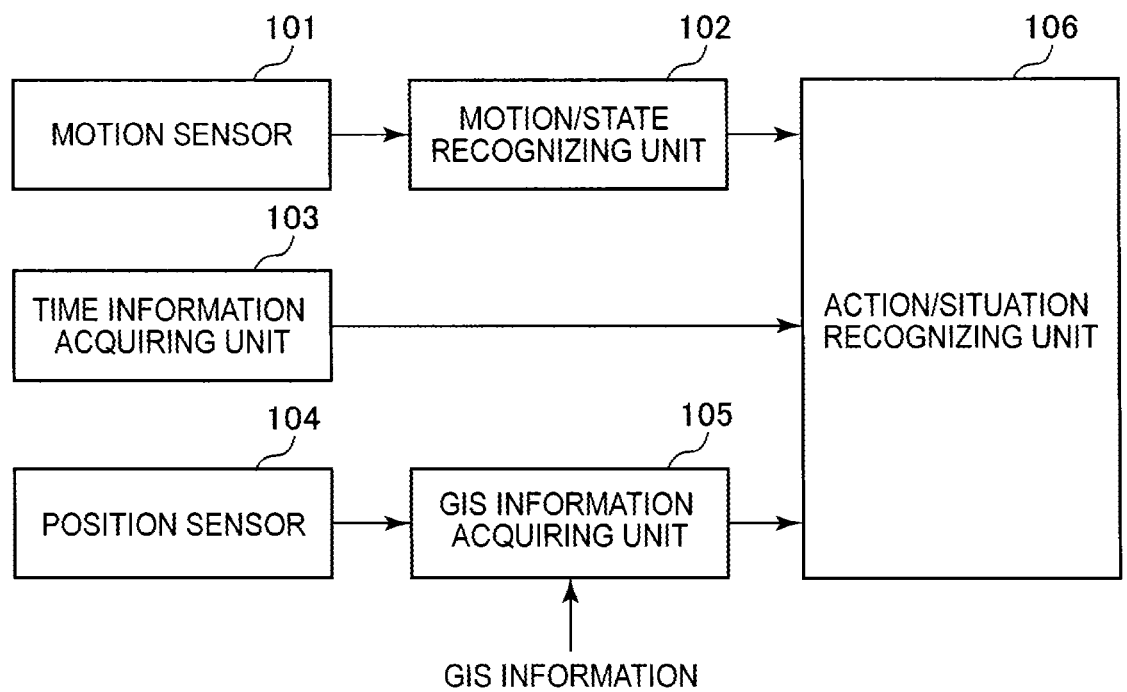
FIG. 1 is an explanatory diagram for explaining a configuration example of an action/situation analysis system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Regarding Flow of Explanation]

Here, a flow of explanation disclosed herein is simply described.

First, with reference to FIG. 1 to FIG. 13, an action pattern recognition technique related to a technique of the present embodiment is explained. Next, with reference to FIG. 14, an example of a system configuration according to an embodiment of the present disclosure is explained. Next, with reference to FIG. 15 to FIG. 23, a function and operation of an information provision system 13 according to configuration example #1 are explained.

Next, with reference to FIG. 24 to FIG. 28, a function and operation of an information provision system 17 according to configuration example #2 are explained. Next, with reference to FIG. 29 and FIG. 30, a function and operation of an information provision system 19 according to configuration example #3 are explained. Next, with reference to FIG. 31, a hardware configuration example that can realize the functions of a system and each device according to the embodiment is explained.

Finally, technical ideas according to the embodiment are summarized and an operational effect acquired from the technical ideas is simply explained.

(Explanation Items)

1: Introduction 1-1: Action pattern recognition technique 1-2: Outline of embodiment 2: Details of embodiment 2-1: Example of system configuration 2-2: Configuration example #1 (suggestion of goal attainment level)

2-2-1: Details of system configuration 2-2-2: Flow of processing 2-2-3: Example of screen display
2-2-4: Alternation example (application to animals)
2-3: Configuration example #2 (display of detailed action)
2-3-1: Details of system configuration
2-3-2: Flow of processing
2-3-3: Example of screen display
2-4: Configuration example #3: (decision of ordinary action or extraordinary action)
2-4-1: Details of system configuration
2-4-2: Application example
2-5: Regarding combination of configuration examples
3: Example Hardware Configuration
4: Conclusion

1: INTRODUCTION

First, an action pattern recognition technique related to a technique of the present embodiment is explained.

1-1: Action Pattern Recognition Technique

The action pattern recognition technique explained herein relates to a technique of detecting a user's action and state using information related to a user's action and state detected by a motion sensor or the like and position information detected by a position sensor or the like.

Also, as the motion sensor, for example, a triaxial acceleration sensor (including an acceleration sensor, a gravity detection sensor and a fall detection sensor) and a triaxial gyro sensor (including an angular velocity sensor, a stabilization sensor and a terrestrial magnetism sensor) are used. Also, for example, it is possible to use information of GPS (Global Positioning System), RFID (Radio Frequency Identification), Wi-Fi access points or wireless base stations as the position sensor. By using their information, for example, it is possible to detect the latitude and longitude of the current position.

(System Configuration of Action/Situation Analysis System 10)

First, with reference to FIG. 1, an explanation is given to the system configuration of the action/situation analysis system 10 that can realize the action pattern recognition technique as described above. FIG. 1 is an explanatory diagram for explaining the entire system configuration of the action/situation analysis system 10.

Here, in the present specification, expression "motion/state" and expression "action/situation" are separated by the following meanings. The expression "motion/state" denotes an action performed by the user in a relatively short period of time of around several seconds to several minutes, and indicates behavior such as "walking," "running," "jumping" and "still." Also, this behavior may be collectively expressed as "motion/state pattern" or "LC (Low-Context) action." Meanwhile, the expression "action/situation" denotes living activities performed by the user in a longer period of time than that in the case of "motion/state," and indicates behavior such as "eating," "shopping" and "working." Also, this behavior may be collectively expressed as "action/situation pattern" or "HC (High-Context) action."

As illustrated in FIG. 1, the action/situation analysis system 10 mainly includes a motion sensor 101, a motion/state recognizing unit 102, a time information acquiring unit 103, a position sensor 104, a GIS information acquiring unit 105 and an action/situation recognizing unit 106.

Also, the action/situation analysis system 10 may include an application AP or service SV using an action/situation pattern detected by the action/situation recognizing unit 106.

Also, it may be formed such that an action/situation pattern use result by the application AP and user profile information are input in the action/situation recognizing unit 106.

First, when the user acts, the motion sensor 101 detects a change of acceleration or rotation around the gravity axis (hereinafter referred to as "sensor data"). The sensor data detected by the motion sensor 101 is input in the motion/state recognizing unit 102 as illustrated in FIG. 2.

Figure 2:
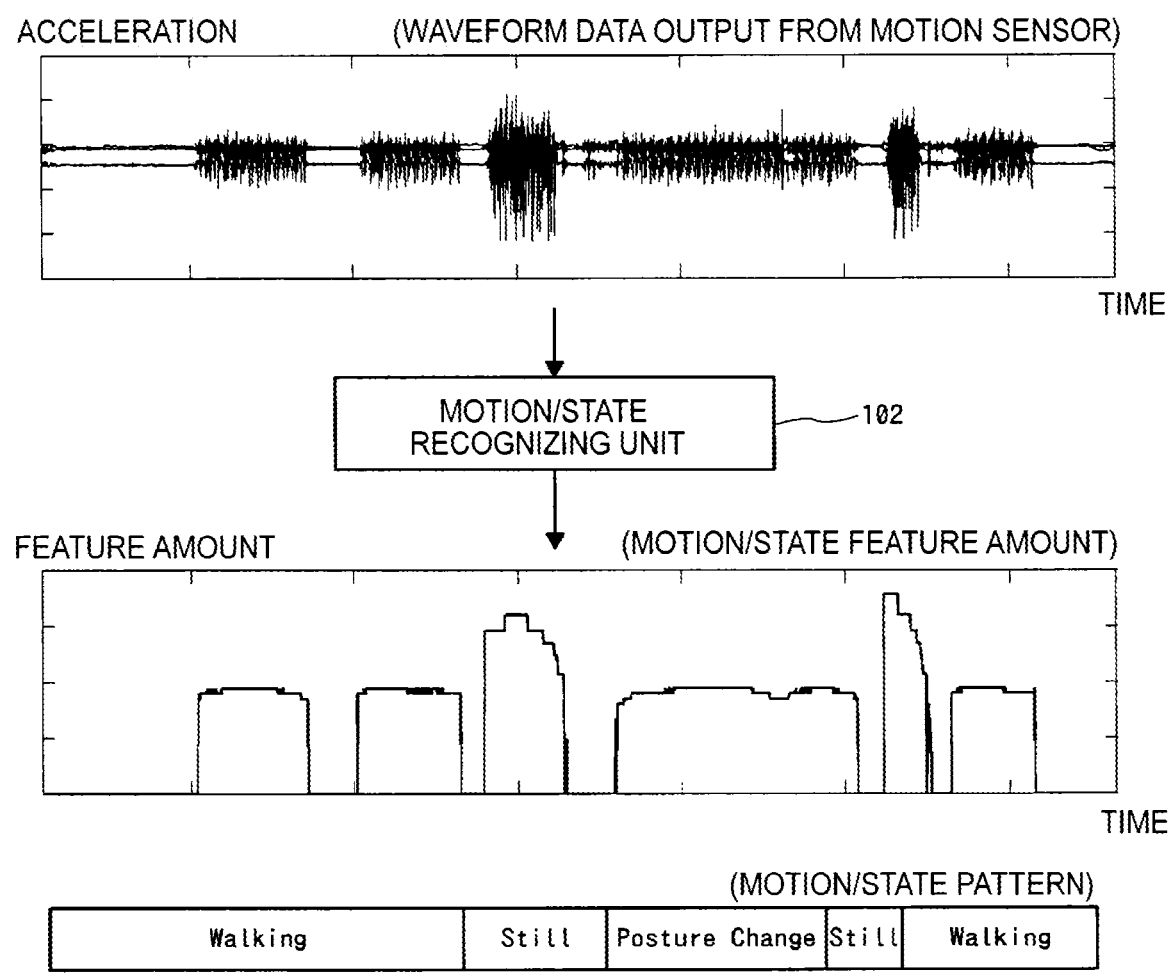
FIG. 2 is an explanatory diagram for explaining a function of a motion/state recognizing unit.
Figure 6:
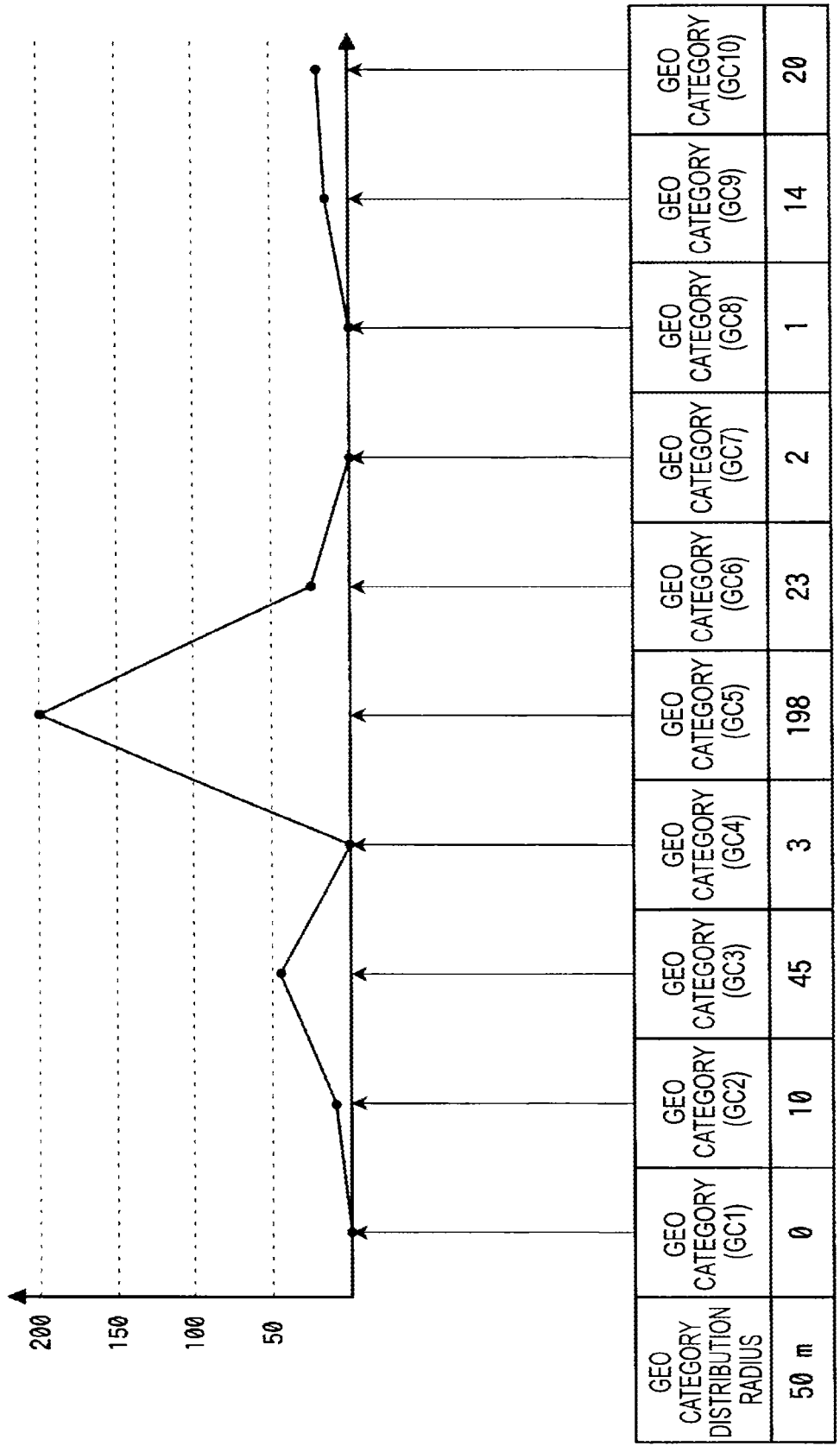
FIG. 6 is an explanatory diagram for explaining a function of a GIS information acquiring unit.

When the sensor data is input, as illustrated in FIG. 2, the motion/state recognizing unit 102 detects a motion/state pattern using the input sensor data. As illustrated in FIG. 3, examples of the motion/state pattern that can be detected by the motion/state recognizing unit 102 include "walking," "running," "still," "jumping," "train (riding/non-riding)" and "elevator (riding/non-riding/rising/falling)." The motion/state pattern detected by the motion/state recognizing unit 102 is input in the action/situation recognizing unit 106.

The position sensor 104 continuously or intermittently acquires position information indicating a user's location (hereinafter referred to as "current position"). For example, the position information of the current position is expressed by latitude and longitude. The position information of the current position acquired by the position sensor 104 is input in the GIS information acquiring unit 105.

When the position information of the current position is input, the GIS information acquiring unit 105 acquires GIS (Geographic Information System) information. Subsequently, as illustrated in FIG. 4, the GIS information acquiring unit 105 detects an attribute of the current position using the acquired GIS information. For example, the GIS information includes map information and various kinds of information acquired by an artificial satellite or field survey, which is information used for scientific research, management of land, facilities or road and urban design. When the GIS information is used, it is possible to decide an attribute of the current position. For example, the GIS information acquiring unit 105 expresses the attribute of the current position using identification information called "geo category code" (for example, see FIG. 5).

As illustrated in FIG. 5, the geo category code denotes a classification code to classify the type of information related to a place. This geo category code is set depending on, for example, a construction type, a landform shape, a geological feature, locality, and so on. Therefore, by specifying the geo category code of the current position, it is possible to recognize an environment in which the user is placed, in some degree.

The GIS information acquiring unit 105 refers to the acquired GIS information, specifies a construction or the like in the current position and the periphery of the current position, and extracts a geo category code corresponding to the construction or the like. The geo category code selected by the GIS information acquiring unit 105 is input in the action/situation recognizing unit 106. Also, in a case where there are many constructions or the like in the periphery of the current position, the GIS information acquiring unit 105 may extract the geo category code of each construction and input information such as geo histograms illustrated in FIG. 6 and FIG. 7, as information related to the extracted geo category, in the action/situation recognizing unit 106.

As illustrated in FIG. 8, the action/situation recognizing unit 106 receives an input of the motion/state pattern from the motion/state recognizing unit 102 and an input of the geo category code from the GIS information acquiring unit 105. Also, the action/situation recognizing unit 106 receives an input of time information from the time information acquiring unit 103. This time information includes information indicating the time at which the motion sensor 101 acquires the sensor data. Also, this time information may include information indicating the time at which the position sensor 104 acquires the position information. Also, the time information may include information such as day information, holiday information and date information, in addition to the information indicating the time.

When the above information is input, the action/situation recognizing unit 106 detects an action/situation pattern based on the input motion/state pattern, the input geo category code (or the geo histograms, for example) and the input time information. At this time, the action/situation recognizing unit 106 detects the action/situation pattern using decision processing based on rules (hereinafter referred to as "rule base decision") and decision processing based on learning models (hereinafter referred to as "learning model decision"). In the following, the rule base decision and the learning model decision are simply explained.

(Regarding Rule Base Decision)

First, the rule base decision is explained. The rule base decision denotes a method of assigning scores to combinations of geo category codes and action/situation patterns and deciding an appropriate action/situation pattern corresponding to input data based on the scores.

A score assignment rule is realized by a score map SM as illustrated in FIG. 9. The score map SM is prepared for each time information, such as date, time zone and day. For example, a score map SM supporting Monday in the first week of March is prepared. Further, the score map SM is prepared for each motion/state pattern, such as walking, running and train. For example, a score map SM during walking is prepared. Therefore, a score map SM is prepared for each of combinations of time information and motion/state patterns.

Figure 10:
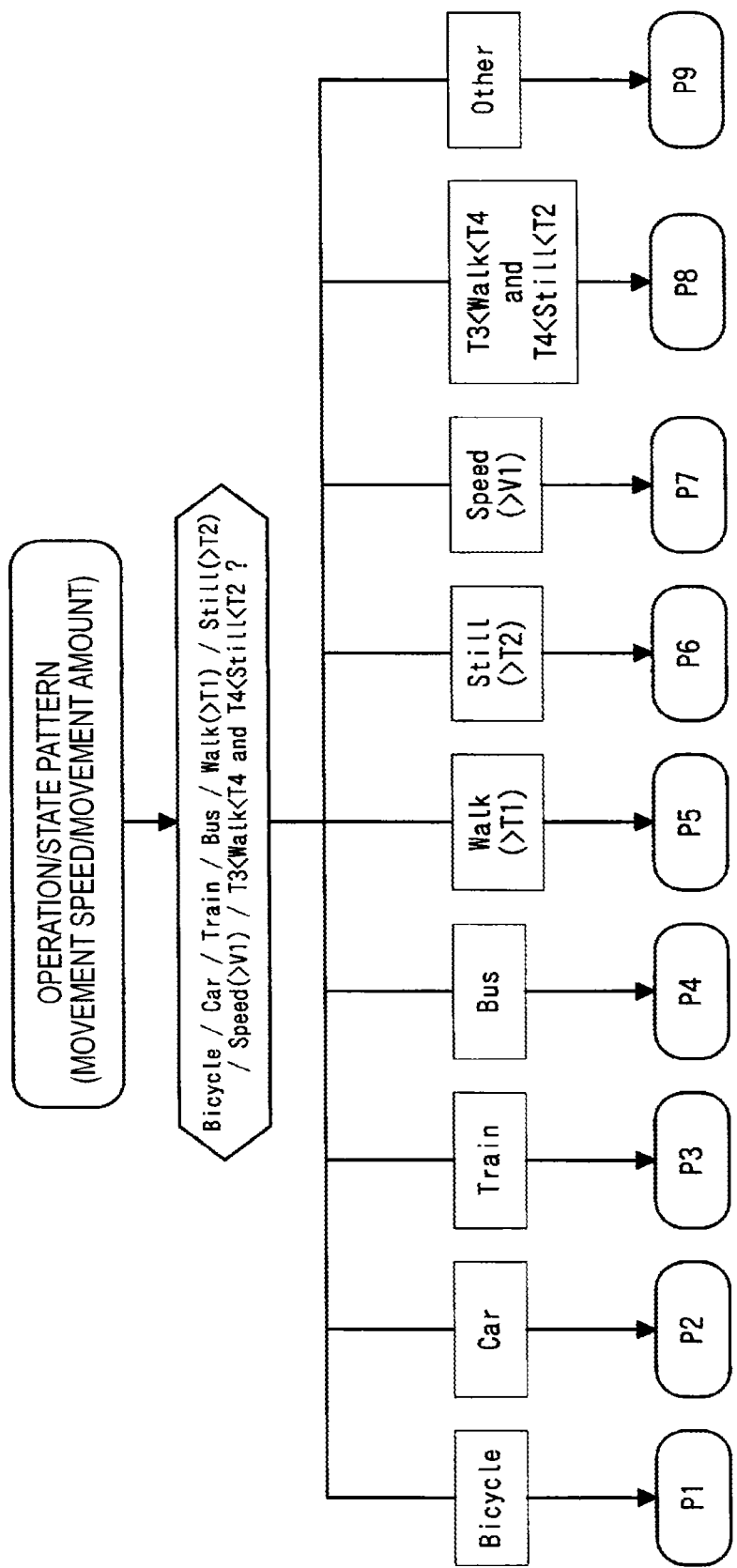
FIG. 10 is an explanatory diagram for explaining an action/situation pattern decision method.
Figure 11:
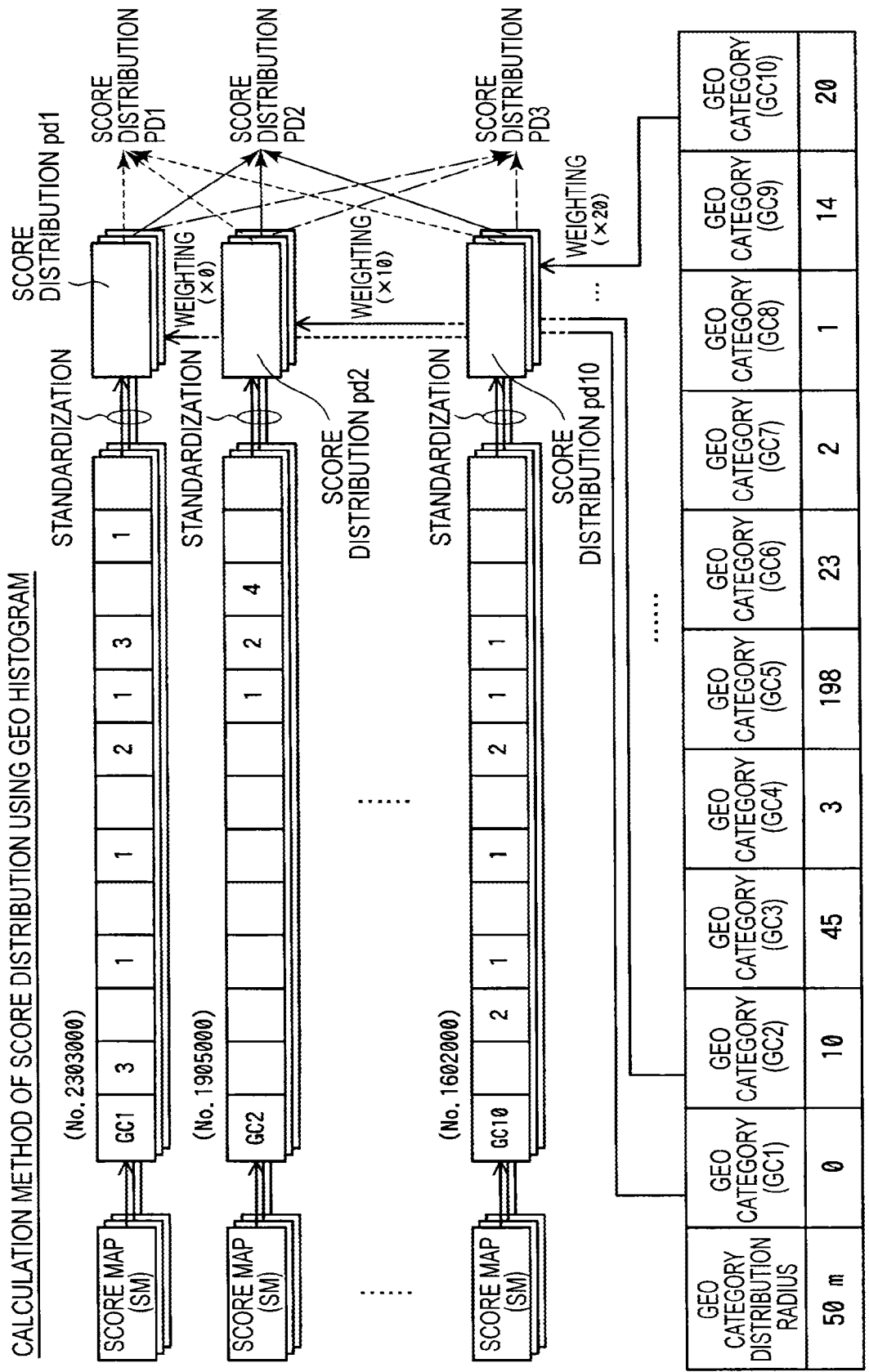
FIG. 11 is an explanatory diagram for explaining a calculation method of score distribution using a geo histogram.

As illustrated in FIG. 10, the action/situation recognizing unit 106 selects a score map SM suitable to input time information and motion/state pattern, from multiple score maps SM prepared in advance. Also, as illustrated in FIG. 11, the action/situation recognizing unit 106 extracts scores corresponding to a geo category code, from the selected score map SM. By this processing, taking into account a state of the current position at the acquisition time of sensor data, the action/situation recognizing unit 106 can extract the score of each action/situation pattern existing in the score map SM.

Next, the action/situation recognizing unit 106 specifies the maximum score among the extracted scores and extracts an action/situation pattern corresponding to the maximum score. Thus, a method of detecting an action/situation pattern is the rule base decision. Here, a score in the score map SM indicates an estimated probability that the user takes an action/situation pattern corresponding to the score. That is, the score map SM indicates score distribution of action/situation patterns estimated to be taken by the user in a state of the current position expressed by a geo category code.

For example, at around three o'clock on Sunday, it is estimated that the user in a department store is highly likely to be "shopping." However, at around 19 o'clock in the same department store, it is estimated that the user in the department store is highly likely to be "eating." Thus, in a certain place, score distribution of action/situation patterns performed by the user denotes the score map SM (accurately, score map SM group).

For example, the score map SM may be input in advance by the user himself/herself or somebody else, or may be acquired using machine learning or the like. Also, the score map SM may be optimized by personal profile information PR or action/situation feedback FB (right and wrong of output action/situation pattern) acquired from the user. As the profile information PR, for example, age, gender, job or home information and workplace information are used. The above is specific processing content of the rule base decision.

(Regarding Learning Model Decision)

Next, the learning model decision is explained. The learning model decision is a method of generating a decision model to decide an action/situation pattern by a machine learning algorithm and deciding an action/situation pattern corresponding to input data by the generated decision model.

As the machine learning algorithm, for example, a k-men method, a nearest neighbor method. SVM, HMM and boosting are available. Here, SVM is an abbreviation of "Support Vector Machine." Also, HMM is an abbreviation of "Hidden Markov Model." In addition to these methods, there is a method of generating a decision model using an algorithm construction method based on genetic search disclosed in Japanese Patent Laid-Open No. 2009-48266.

Figure 12:
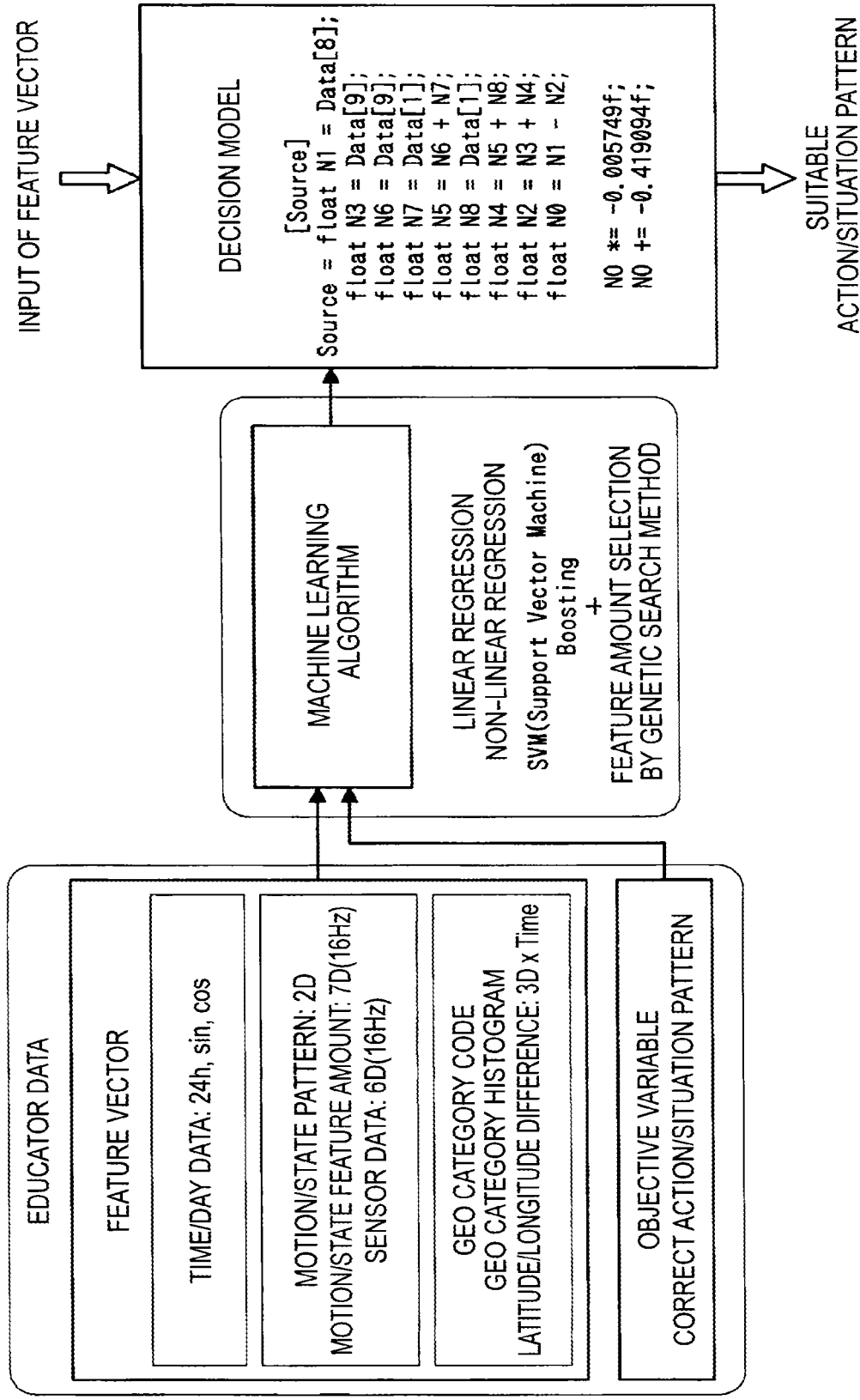
FIG. 12 is an explanatory diagram for explaining a calculation method of score distribution using machine learning.

As a feature amount vector input in a machine learning algorithm, for example, as illustrated in FIG. 12, time information, motion/state pattern, geo category code (or geo category histogram), sensor data and position information of the current position are available. Here, in the case of using an algorithm construction method based on generic search, a generic search algorithm is used on a feature amount vector selection stage in learning process. First, the action/situation recognizing unit 106 inputs a feature amount vector in which a correct action/situation pattern is known, in a machine learning algorithm, as learning data, and generates a decision model to decide the accuracy of each action/situation pattern or an optimal action/situation pattern.

Next, the action/situation recognizing unit 106 inputs input data in the generated decision model and decides an action/situation pattern estimated to be suitable to the input data. However, in a case where it is possible to acquire right and wrong feedback with respect to a result of decision performed using the generated decision model, the decision model is reconstructed using the feedback. In this case, the action/situation recognizing unit 106 decides an action/situation pattern estimated to be suitable to the input data using the reconstructed decision model. The above is specific processing content of the learning model decision.

By the above-described method, the action/situation recognizing unit 106 detects an action/situation pattern as illustrated in FIG. 13. Subsequently, the action/situation pattern detected by the action/situation recognizing unit 106 is used to provide recommended service SV based on the actionisituation pattern or used by an application AP that performs processing based on the action/situation pattern.

The system configuration of the action/situation analysis system 10 has been described above. Techniques according to an embodiment described below relate to functions of the action/situation analysis system 10 described above. Also, regarding detailed functions of the action/situation analysis system 10, for example, the disclosure of Japanese Patent Laid-Open No. 2011-081431 serves as a reference.

1-2: Outline of Embodiment

In the following, an outline of the present embodiment is described. Techniques according to the present embodiment relate to a system of providing information of high value by combining action pattern information acquired by using the above action/situation analysis system 10 and input information such as text information.

For example, configuration example #1 introduced below relates to a system of providing, based on one or multiple action patterns corresponding to a "predetermined matter," "state information" representing a state related to the matter. For example, the above "predetermined matter" denotes the user's goal/declaration acquired from input information and the above "state information" denotes the attainment level with respect to the goal/declaration.

The above "predetermined matter" is not limited to the user's goal/declaration acquired from input information and the above "state information" is not limited to the attainment level with respect to the goal/declaration, but, in configuration example #1 described below, an explanation is given using an example where the attainment level with respect to the user's goal/declaration mainly acquired from input information is provided to the user.

Also, in addition to the attainment level which is an example of comparison information between the current state with respect to a predetermined matter and a state in a case where the goal/declaration is attained, for example, the "state information" may denote information indicating the current state with respect to the predetermined matter or comparison information between the current state with respect to the predetermined matter and a past state. Even in this case, a technique according to configuration example #1 described below is applicable.

Also, configuration #2 described below relates to a system of: attaching information related to a user's experience acquired from input information such as text information to action pattern information acquired by the above action/situation analysis system 10; and providing more detailed information to the user. Further, configuration example #3 described below relates to a system of: deciding an explanatory action or experience among action pattern information acquired using the above action/situation analysis system 10 and a user's experience acquired from input information such as text information; and providing it to the user.

Also, it is possible to arbitrarily combine the techniques according to these configuration examples #1 to #3. Also, in the following explanation, although text information is mainly assumed as input information used for experience extraction, for example, it is possible to use sound information acquired using a microphone. In this case, it is possible to acquire information related to a surrounding environment or action using a waveform of the sound signal as is, or it is possible to acquire text information from the sound signal using a sound recognition technique. Since it is possible to acquire text information in the case of using the sound recognition technique, it is possible to apply the techniques according to below-described configuration examples #1 to #3 as is.

2: DETAILS OF EMBODIMENT

In the following, details of techniques according to the present embodiment are explained.

2-1: Example of System Configuration

Figure 14:
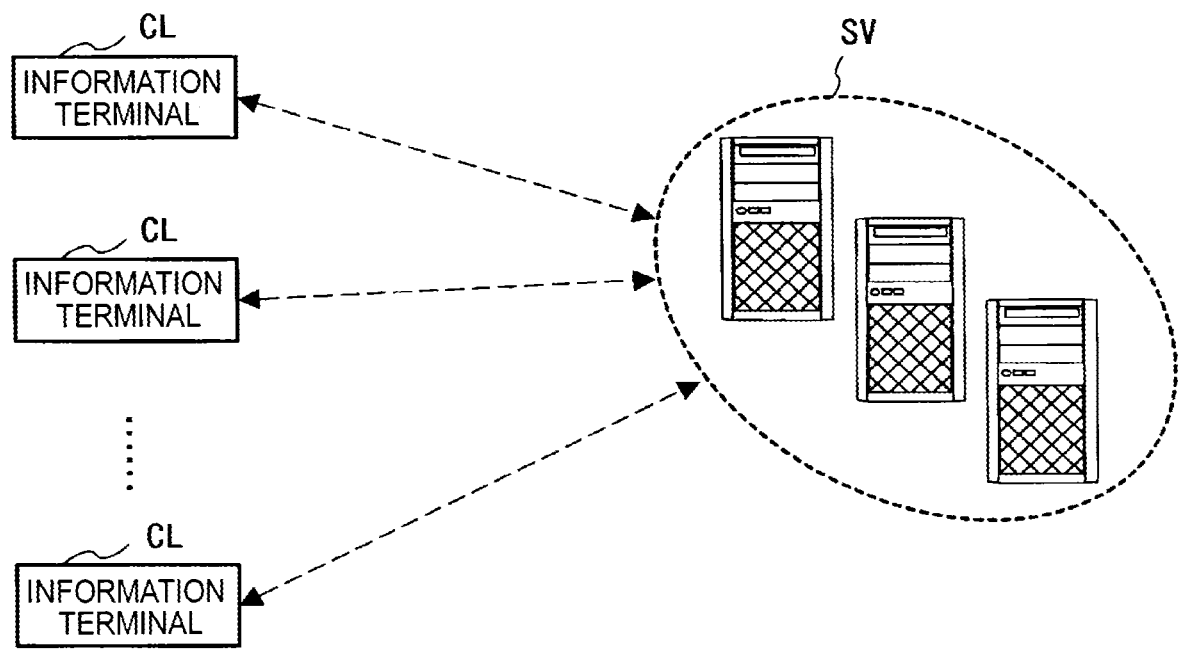
FIG. 14 is an explanatory diagram for explaining an example of a system configuration according to an embodiment of the present disclosure.

First, with reference to FIG. 14, an example of a system configuration according to the present embodiment is introduced. FIG. 14 is an explanatory diagram for explaining an example of the system configuration according to the present embodiment. Also, the system configuration introduced herein is just an example and it is possible to apply a technique according to the present embodiment to various system configurations available now and in the future.

As illustrated in FIG. 14, information provision systems 13, 17 and 19 described below mainly include multiple information terminals CL and a server apparatus SV. The information terminal CL is an example of a device used by a user. As the information terminal CL, for example, a mobile phone, a smart phone, a digital still camera, a digital video camera, a personal computer, a table terminal, a car navigation system, a portable game device, health appliances (including a pedometer (registered trademark)) and medical equipment are assumed. Meanwhile, as the server apparatus SV, for example, a home server and a cloud computing system are assumed.

Naturally, a system configuration to which a technique according to the present embodiment is applicable is not limited to the example in FIG. 14, but, for convenience of explanation, an explanation is given with an assumption of the multiple information terminals CL and the server apparatus SV which are connected by wired and/or wireless networks. Therefore, a configuration is assumed in which it is possible to exchange information between the information terminals CL and the server apparatus SV. However, it is possible to employ a configuration such that, among various functions held by the information provision systems 13, 17 and 19, functions to be held by the information terminals CL and functions to be held by the server apparatus SV are freely designed. For example, it is desirable to design it taking into account the computing power and communication speed of the information terminals CL.

2-2: Configuration Example #1 (Suggestion of Goal Attainment Level)

First, configuration example #1 is explained. Configuration example #1 relates to a system to provide, to a user, the attainment level with respect to the user's goal/declaration acquired from input information.

2-2-1: Details of System Configuration

Figure 15:
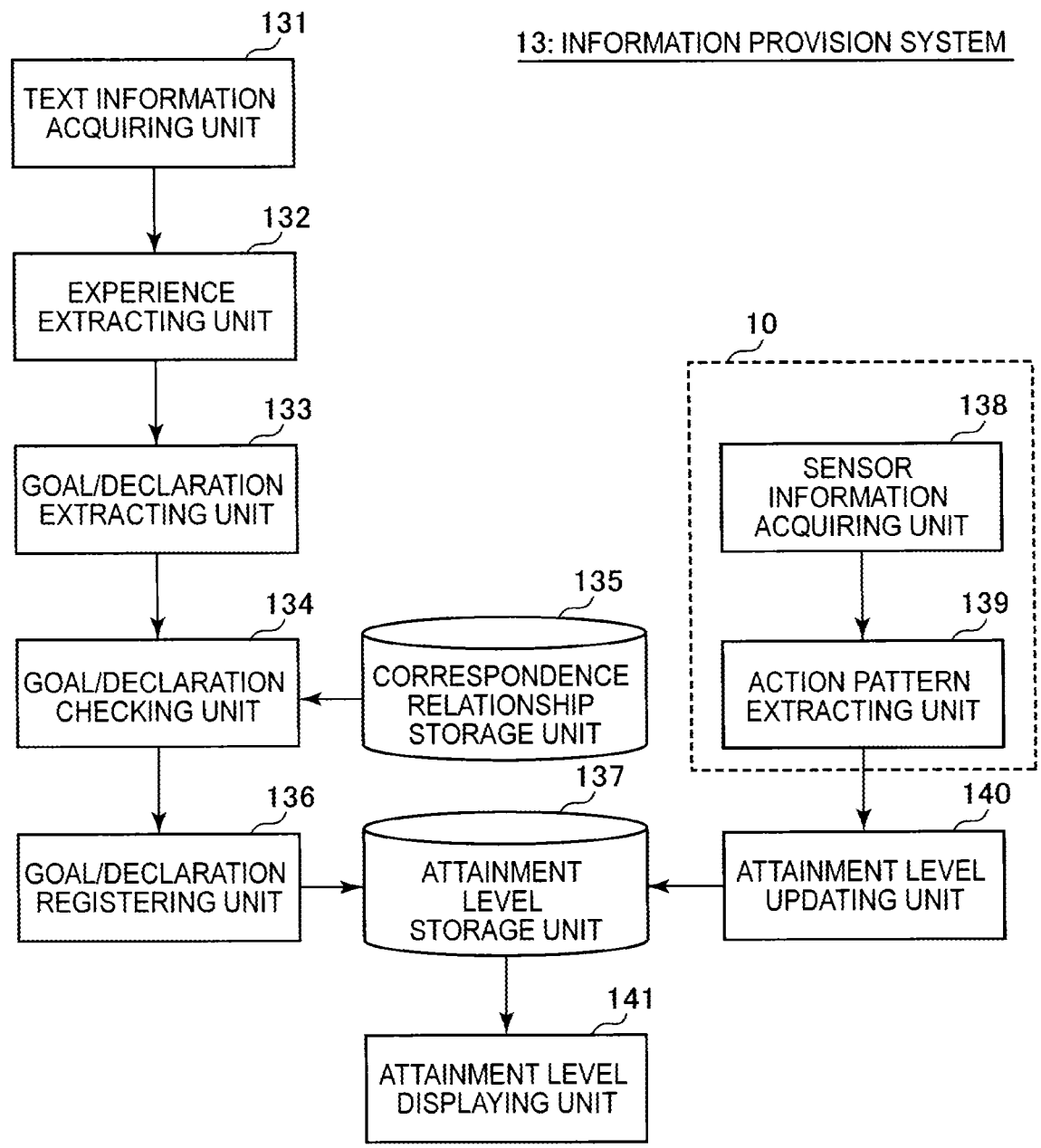
FIG. 15 is an explanatory diagram for explaining a configuration of an information provision system according to configuration example #1.

A system (i.e. information provision system 13) according to configuration example #1 is as illustrated in FIG. 15, for example. As illustrated in FIG. 15, the information provision system 13 includes a text information acquiring unit 131, an experience extracting unit 132, a goal/declaration extracting unit 133, a goal/declaration checking unit 134, a correspondence relationship storage unit 135 and a goal/declaration registering unit 136. Further, the information provision system 13 includes an attainment level storage unit 137, a sensor information acquiring unit 138, an action pattern extracting unit 139, an attainment level updating unit 140 and an attainment level displaying unit 141.

Also, functions of the sensor information acquiring unit 138 and the action pattern extracting unit 139 can be realized using a function of the action/situation analysis system 10 described above. Also, among the above components held by the information provision system 13, it is possible to freely design components whose functions are held by the information terminals CL and components whose functions are held by the server apparatus SV. For example, it is desirable to design it taking into account the computing power and communication speed of the information terminals CL.

The text information acquiring unit 131 acquires text information input by a user. For example, the text information acquiring unit 131 may denote an input device to input a text by the user or denote an information collection device to acquire text information from social network services or applications. Here, for convenience of explanation, an explanation is given with an assumption that the text information acquiring unit 131 denotes an input unit such as a software keyboard.

The text information acquired by the text information acquiring unit 131 is input in the experience extracting unit 132. At this time, the experience extracting unit 132 may receive an input of the text information together with time information at the time of the input of the text information. When the text information is input, the experience extracting unit 132 analyzes the input text information and extracts information related to user's experiences from the text information. For example, the information related to experiences denotes information including an experienced event (such as an experience type), a place of the experience and the time of the experience.

Figure 16:
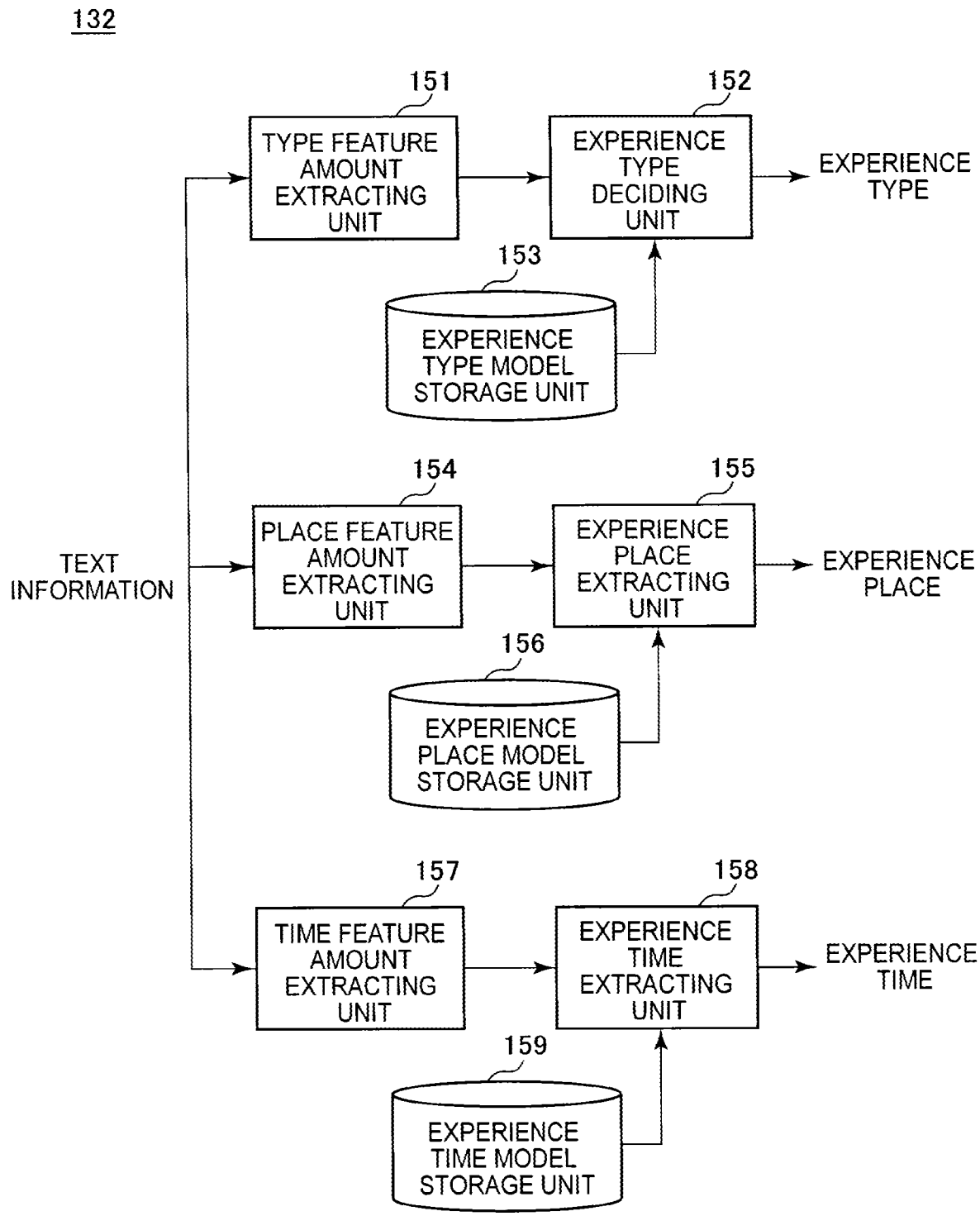
FIG. 16 is an explanatory diagram for explaining details of a function of an information provision system according to configuration example #1.

Here, a functional configuration of the experience extracting unit 132 is explained in detail with reference to FIG. 16. As illustrated in FIG. 16, the experience extracting unit 132 mainly includes a type feature amount extracting unit 151, an experience type deciding unit 152 and an experience type model storage unit 153. Further, the experience extracting unit 132 includes a place feature amount extracting unit 154, an experience place extracting unit 155 and an experience place model storage unit 156. Further, the experience extracting unit 132 includes a time feature amount extracting unit 157, an experience time extracting unit 158 and an experience time model storage unit 159.

When the text information is input in the experience extracting unit 132, the text information is input in the type feature amount extracting unit 151, the place feature amount extracting unit 154 and the time feature amount extracting unit 157.

The type feature amount extracting unit 151 extracts a feature amount related to an experience type (hereinafter referred to as "type feature amount") from the input text information. The type feature amount extracted by the type feature amount extracting unit 151 is input in the experience type deciding unit 152. The experience type deciding unit 152 decides an experience type from the input type feature amount, using a learning model stored in the experience type model storage unit 153. Subsequently, the decision result in the experience type deciding unit 152 is input in the goal/declaration extracting unit 133.

Also, the place feature amount extracting unit 154 extracts a feature amount related to a place of the experience (hereinafter referred to as "place feature amount") from the input text information. The place feature amount extracted by the place feature amount extracting unit 154 is input in the experience place deciding unit 155. The experience place deciding unit 155 decides a place of the experience from the input place feature amount, using a learning model stored in the experience place model storage unit 156. Subsequently, the decision result in the experience place deciding unit 155 is input in the goal/declaration extracting unit 133.

Also, the time feature amount extracting unit 157 extracts a feature amount related to the time of the experience (hereinafter referred to as "time feature amount") from the input text information. The time feature amount extracted by the time feature amount extracting unit 157 is input in the experience time deciding unit 158. The experience time deciding unit 158 decides the time of the experience from the input time feature amount, using a learning model stored in the experience time model storage unit 159. Subsequently, the decision result in the experience time deciding unit 158 is input in the goal/declaration extracting unit 133.

Figure 17:
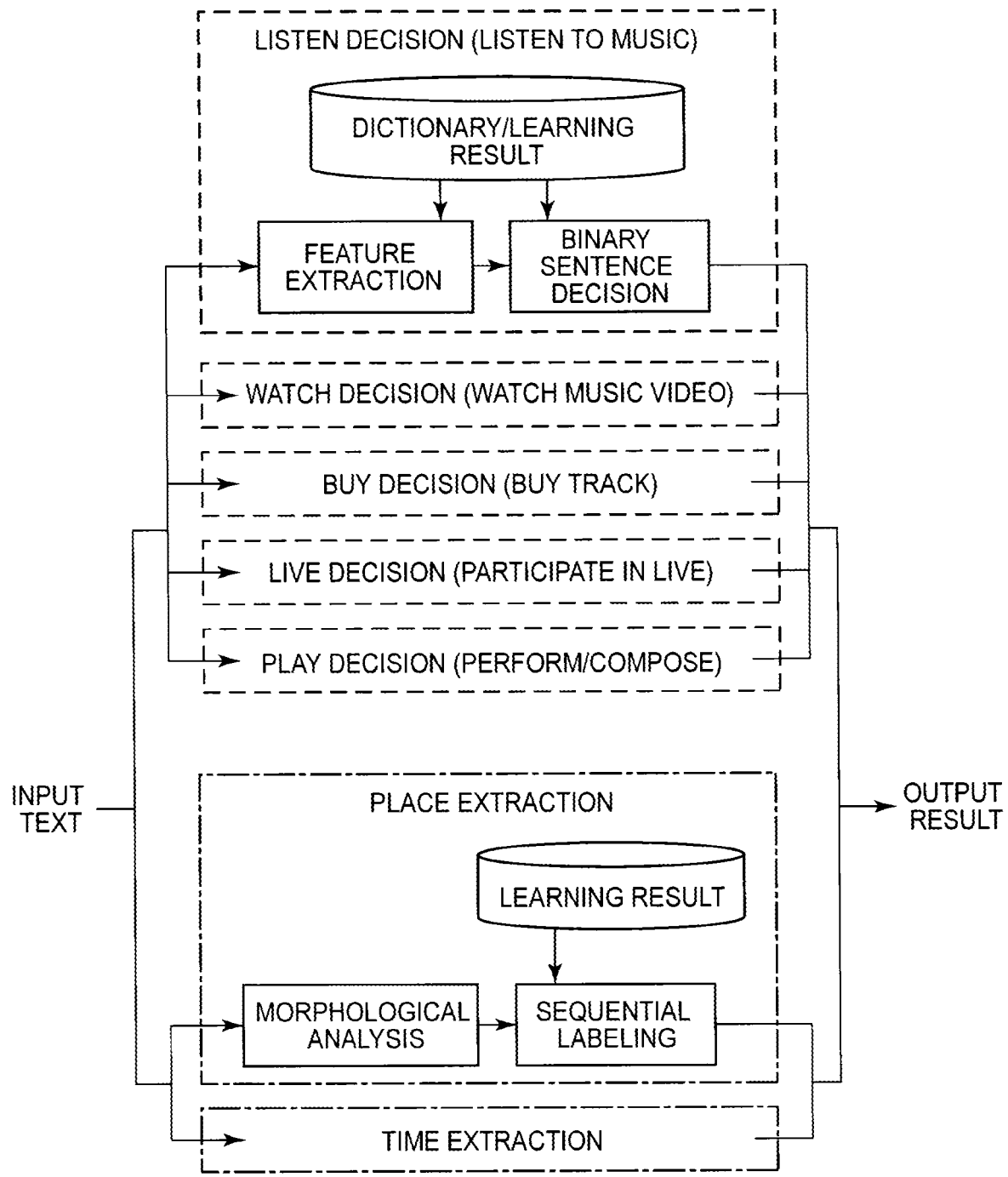
FIG. 17 is an explanatory diagram for explaining details of a function of an information provision system according to configuration example #1.

Here, with reference to FIG. 17, content of processing performed by the experience extracting unit 132 is supplementarily explained using a music experience as an example. FIG. 17 is an explanatory diagram for explaining content of specific processing performed by the experience extracting unit 132. Also, for convenience of explanation, although an explanation is given using a music experience as an example, the technical scope of the present embodiment is not limited to this.

As illustrated in FIG. 17, in the case of a music experience, possible examples of the experience type include "listen to music (listen)," "watch a music video on TV/movie/DVD (watch)," "buy a track/CD (buy)," "participate in a live or concert (live)" and "sing/perform/compose a song (play)." The experience extracting unit 132 decides these experience types using the functions of the type feature amount extracting unit 151 and the experience type deciding unit 152.

For example, in the case of deciding an experience type of "listen," first, the type feature amount extracting unit 151 extracts a type feature amount related to the experience type of "listen" by a method of morpheme, n-gram or maximum substring. Next, the experience type deciding unit 152 decides, from the type feature amount, whether it corresponds to the experience type of "listen," by a method such as SVM and logical regression. The decision result in the experience type deciding unit 152 is output as information indicating the experience type. Similarly, decision results with respect to experience types of "watch," "buy," "live" and "play" are acquired.

Figure 18:
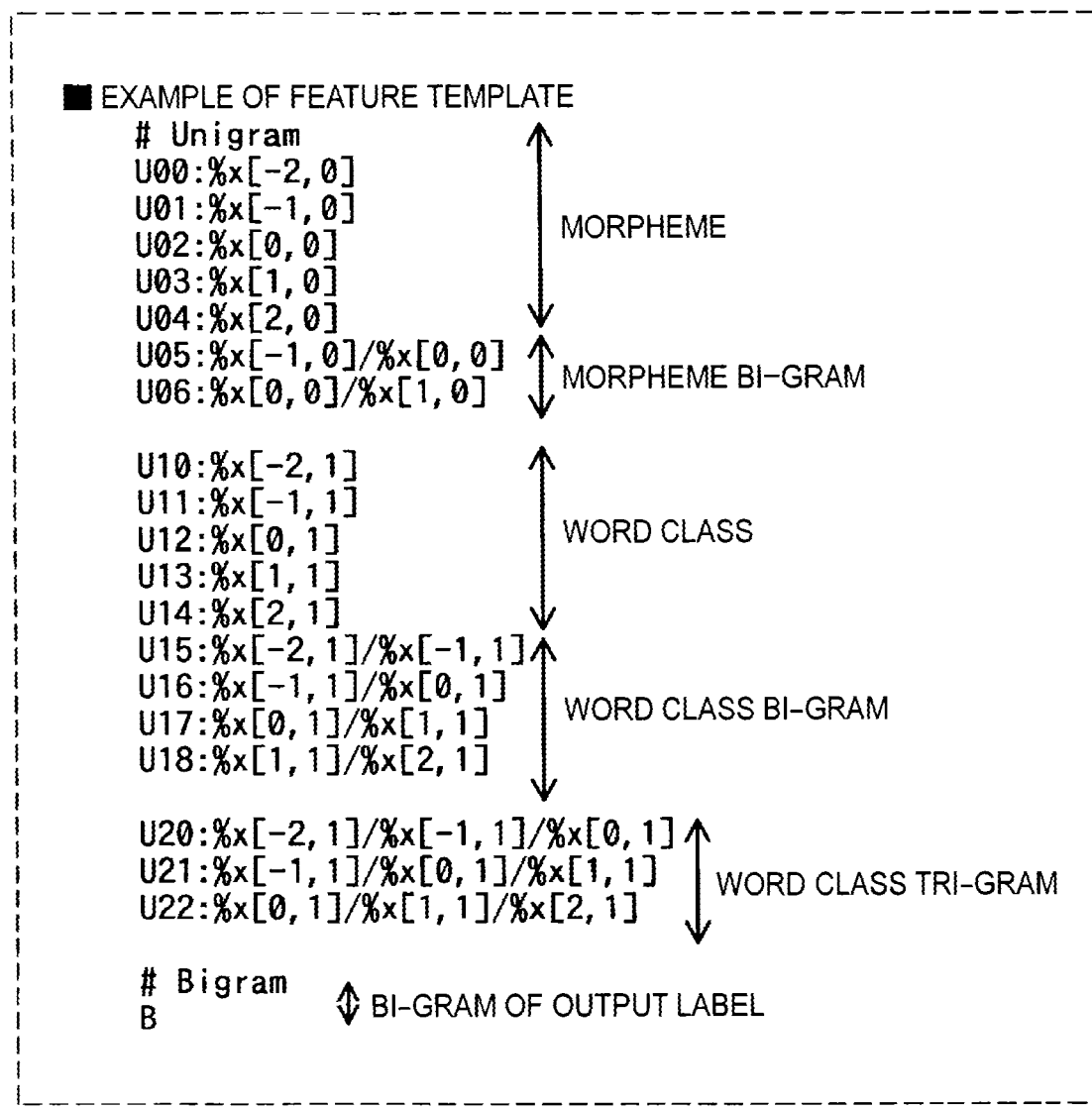
FIG. 18 is an explanatory diagram for explaining details of a function of an information provision system according to configuration example #1.

Also, experience place extraction is realized by the functions of the place feature amount extracting unit 154 and the experience place extracting unit 155. First, the place feature amount extracting unit 154 performs a morphological analysis for input text information and inputs the result in the experience place extracting unit 155. Next, based on the morphological analysis result, the experience place extracting unit 155 extracts an experience place using a method such as CRF (Conditional Random Field). For example, the experience place extracting unit 155 extracts an experience place (in the example in FIG. 19, extracts "Kyoto station") as illustrated in FIG. 19, using a feature template as illustrated in FIG. 18.

Also, experience time extraction is realized by the functions of the time feature amount extracting unit 157 and the experience time extracting unit 158. Similar to the above experience place extraction, the experience time extraction is realized by a sequential labeling method using morphological analysis, CRF and so on. Also, as expression of the experience time, for example, it is possible to use expression of various units such as "present," "past," "future," "morning," "evening" and "night." Information of the experience place and the experience time acquired in this way is input together with the decision result indicating the experience type, in the goal/declaration extracting unit 133. Here, there is a case where part or all of the experience type, the experience place and the experience type are not necessarily acquired.

FIG. 15 is referred to again. When the information of the experience type, the experience place and the experience type is acquired, the goal/declaration extracting unit 133 decides whether the text information includes information related to goals/declaration, using the information of the experience type and the experience time. For example, as illustrated in FIG. 20, in a case where the experience type is "diet" and the experience time is "future," the goal/declaration extracting unit 133 decides that text information corresponding to these results includes the goal/declaration. Meanwhile, even when the experience type is "diet," in a case where the experience time is "past," the goal/declaration extracting unit 133 decides that text information corresponding to these results does not include the goal/declaration.

That is, in a case where the experience type corresponds to the goal/declaration and the experience time is future, the goal/declaration extracting unit 133 decides that text information corresponding to these results includes the goal/declaration. Subsequently, the goal/declaration extracting unit 133 extracts the experience type acquired from the text information decided to include the goal/declaration, as the goal/declaration. Subsequently, information of the goal/declaration extracted by the goal/declaration extracting unit 133 is input in the goal/declaration checking unit 134. When the information of the goal/declaration is input, the goal/declaration checking unit 134 refers to the correspondence relationship storage unit 135, specifies one or multiple action patterns related to the input goal/declaration and extracts each specified action pattern.

Here, in the above explanation, although the goal/declaration checking unit 134 specifies one or multiple action patterns with respect to the information of the goal/declaration after the information of the goal/declaration is input, an applicable scope of the technique according to the present embodiment is not limited to this.

For example, all action patterns that can be acquired in advance may be recognized regardless of whether they are related to a goal/declaration, and the recognition results may be stored in a database. In this case, when a goal/declaration is input, data of an action pattern associated with the input goal/declaration may be referred to from the database storing all action pattern recognition results.

For example, as illustrated in FIG. 21, the correspondence relationship storage unit 135 stores a database showing correspondence relationships between goals/declaration and action patterns. Also, in the example in FIG. 21, the contribution level is associated with each of the combinations between goals/declaration and action patterns. For example, in a case where dieting is the goal/declaration, actions such as "walking" and "running" are effective for the dieting but actions such as "getting in a car" and "taking a train" are not effective for the dieting. From such a viewpoint, in the example in FIG. 21, the contribution level is associated with each of combinations between goals/declaration and action patterns.

The goal/declaration checking unit 134 inputs information of a goal/declaration and information of an action pattern associated with the goal/declaration in the goal/declaration registering unit 136. When the information of the goal/declaration and the information of the action pattern associated with the goal/declaration are input, the goal/declaration registering unit 136 registers the input goal/declaration and action pattern in the attainment level storage unit 137. When the goal/declaration is registered in this way, calculation of the attainment level with respect to the registered goal/declaration and provision of information with respect to the attainment level start. Also, the attainment level is calculated according to an action pattern every day, and information of the attainment level with respect to the goal/declaration is provided to a user in real time.

FIG. 15 is referred to again. Action pattern detection is realized by the functions of the sensor information acquiring unit 138 and the action pattern extracting unit 139. First, the sensor information acquiring unit 138 acquires sensor information from a motion sensor, position sensor or the like. The sensor information acquired by the sensor information acquiring unit 138 is input in the action pattern extracting unit 139. The action pattern extracting unit 139 extracts an action pattern from the input sensor information. Information of the action pattern extracted by the action pattern extracting unit 139 is input in the attainment level updating unit 140. Also, as an action pattern extraction method, it is possible to apply the same method as the above action pattern extraction method by the action/situation analysis system 10.

When the information of the action pattern is input, the attainment level updating unit 140 refers to information related to goals/declaration registered in the attainment level storage unit 137, and decides whether the action pattern indicated by the input information corresponds to an action pattern associated with the goal/declaration. In a case where it corresponds to the action pattern associated with the action pattern associated with the goal/declaration, the attainment level storage unit 137 recognizes an attainment effect (for example, see FIG. 21) associated with a combination of the goal/declaration and the input action pattern. Next, the attainment level storage unit 137 calculates the current attainment level based on an update value of the attainment level associated with the attainment effect, and stores it in the attainment level storage unit 137.

For example, regarding a case where the goal/declaration is "dieting," attainment effect "nothing" equals to −5 points, attainment effect "low" equals to +5 points, attainment effect "medium" equals to +15 points and attainment effect "high" equals to +30 points, it is specifically considered with reference to FIG. 22. First, in a case where the user takes a train for one hour, since an action pattern "taking a train (attainment effect "nothing")" is detected, the attainment level updating unit 140 sets the current attainment level to "−5 points." Next, in a case where the user walks for ten minutes, since an action pattern "walking (attainment effect "medium")" is detected, the attainment level updating unit 140 adds 15 points to the previous attainment level and updates the current attainment level to "10 points." Thus, the attainment level is updated based on an action pattern.

FIG. 15 is referred to again. As described above, the attainment level per goal/declaration stored in the attainment level storage unit 137 is updated in real time. The attainment level per goal/declaration stored in the attainment level storage unit 137 is read by the attainment level displaying unit 141 and presented to the user. For example, as illustrated in display examples #1 and #2 in FIG. 22, the attainment level displaying unit 141 displays an object indicating an action pattern taken by the user, together with a value of the attainment level updated according to the action. Display example #1 shows that, since the user takes an action "running," the attainment level is increased and the updated attainment level is set to 35.

The configuration of the information provision system 13 according to configuration example #1 has been explained above. Here, in the above explanation, although an explanation has been given along a flow of processing to analyze text information first and analyze sensor information later, the order of analysis processing may be reverse. Also, a report method of the attainment level may be audio guidance instead of screen display or may be an expression method by vibration or blinking. For example, there is a possible configuration in which the intensity of vibration changes according to the attainment level or the blinking speed or brightness changes. Such alternation naturally belongs to the technical scope of the present embodiment too.

2-2-2: Flow of Processing

Figure 23:
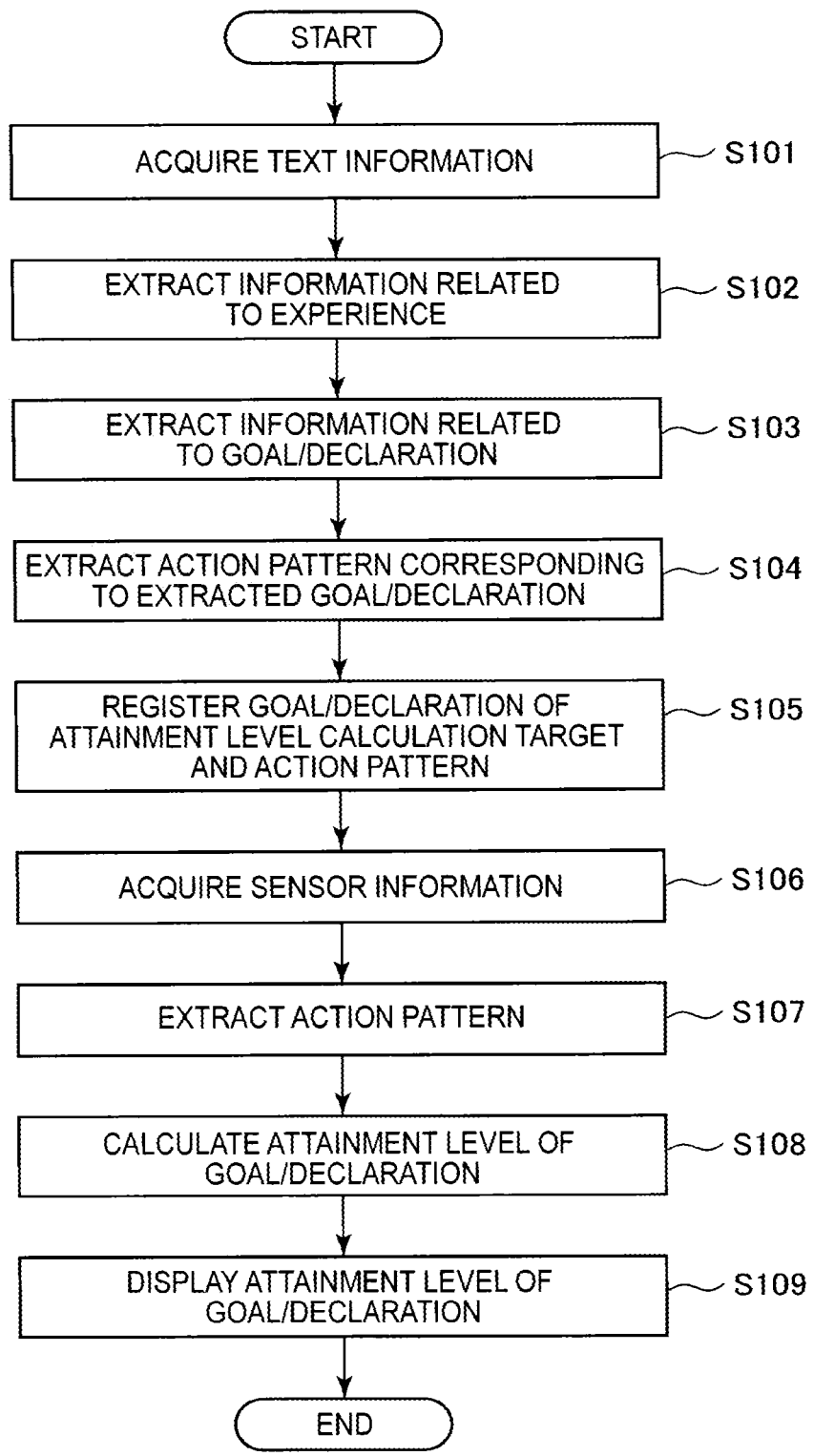
FIG. 23 is an explanatory diagram for explaining an operation of an information provision system according to configuration example #1.

Next, with reference to FIG. 23, a flow of processing performed by the information provision system 13 is explained. FIG. 23 is an explanatory diagram for explaining a flow of processing performed by the information provision system 13. Also, the order of part of processing steps illustrated in FIG. 23 may be changed. For example, the order of a processing step related to text information analysis and the order of a processing step related to sensor information analysis may be switched.

As illustrated in FIG. 23, first, the information provision system 13 acquires text information by the function of the text information acquiring unit 131 (S101). Next, the information provision system 13 extracts information related to experiences, from the text information, by the function of the experience extracting unit 132 (S102). Examples of the information related to experiences include an experience type, an experience place and experience time. Next, the information provision system 13 extracts information related to goals/declaration from the information related to experiences, by the function of the goal/declaration extracting unit 133 (S103).

Next, the information provision system 13 extracts an action pattern corresponding to the goal/declaration extracted in step S103, by the function of the goal/declaration checking unit 134 (S104). Next, the information provision system 13 registers a goal/declaration for which the attainment level is calculated and an action pattern corresponding to the goal/declaration, in the attainment level storage unit 137, by the function of the goal/declaration registering unit 136 (S105).

Meanwhile, the information provision system 13 acquires sensor information by the function of the sensor information acquiring unit 138 (S106). Next, the information provision system 13 extracts an action pattern from the sensor information by the function of the action pattern extracting unit 139 (S107). Next, by the function of the attainment level updating unit 140, the information provision system 13 recognizes an attainment effect of a goal/declaration corresponding to the action pattern extracted in step S107 and calculates the current attainment level based on the recognized attainment effect (S108). Next, the information provision system 13 displays the attainment level of the goal/declaration by the function of the attainment level displaying unit 141 (S109) and finishes a series of processing.

The flow of processing performed by the information provision system 13 has been explained above.

2-2-3: Example of Screen Display

An attainment level display method is supplementarily explained below.

As an attainment level display method, there are methods such as display examples #1 and #2 in FIG. 22. That is, as an example, there is provided a method of displaying an object corresponding to the current action pattern and displaying the attainment level acquired as a result of taking the current action pattern. Especially, in the example in FIG. 22, whether the attainment level is increased by the current action pattern or the attainment level is decreased by the current action pattern is indicated by an arrow, which causes an effect with respect to a goal/declaration to be identified at first sight. By such display, it is possible to encourage the user to take an action pattern leading to a good effect. Also, since the effect is reflected to a numerical value of the attainment level in real time, an effect of keeping motivation of the user tackling the goal/declaration can be expected.

2-2-4: Alternation Example (Application to Animals)

By the way, an explanation has been given to the technique for human action patterns. However, the technique according to configuration example #1 is applicable to other animals than human beings. For example, by wearing a sensor on a collar of a pet such as a dog and a cat and inputting a goal/declaration of the pet as text information by an animal guardian, it is possible to acquire the goal attainment level of the pet. For example, it is possible to acquire data such as the intensity of pet's activity in a place or time zone on which the animal guardian does not keep an eye. By analyzing such data and managing the pet's health, it is possible to produce an effect of preventing pet's disease or the like.

The technique according to configuration example #1 has been explained above. According to the technique according to above configuration example #1, it is possible to present an attainment state related to user's declaration from the matching state of the user's declaration acquired from input information and an estimated action pattern.

Application Example

As described above, when the technique according to configuration example #1 is applied, it is possible to acquire the attainment level based on user's goal/declaration and action pattern. Therefore, it is possible to realize a display method of graphing this attainment level and displaying it to the user or a display method of displaying the degree of effort for the goal/declaration depending on whether the attainment level tends to increase for attainment of the goal/declaration or the attainment level tends to decrease for attainment of the goal/declaration. Further, in a situation in which it is difficult to attain the goal/declaration (e.g. in a situation in which the attainment level is extremely low (such as a case where it is below a threshold)), it is possible to realize a display method of: presenting a representative example (with high frequency) or histogram of action patterns which are a cause of decreasing the attainment level; and presenting the cause of the difficult situation to the user. Further, by presenting an action pattern having an opposite tendency to the representative example of action patterns which are a cause of decreasing the attainment level, it is possible to realize a display method in which advice is given to the user to attain the goal/declaration. By applying such a display method, it is possible to directly or indirectly support the user to attain the goal/declaration.

2-3: Configuration Example #2 (Display of Detailed Action)

Next, configuration example #2 is explained. Configuration example #2 relates to a system of adding information related to user's experiences acquired from input information to action pattern information and providing the result.

2-3-1: Details of System Configuration

Figure 24:
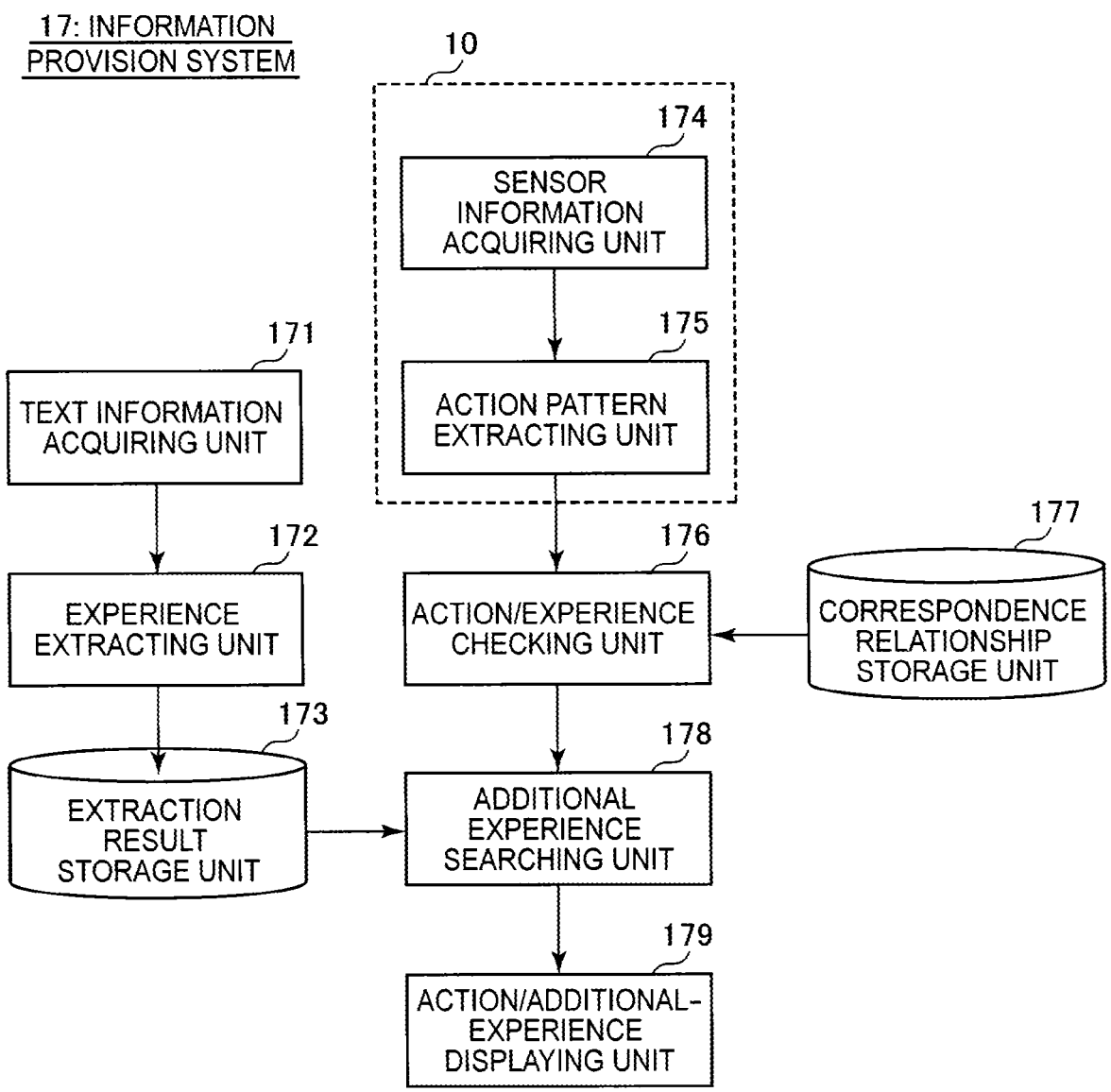
FIG. 24 is an explanatory diagram for explaining a configuration of an information provision system according to configuration example #2.

A system (i.e. information provision system 17) according to configuration example #2 is as illustrated in FIG. 24, for example. As illustrated in FIG. 24, the information provision system 17 includes a text information acquiring unit 171, an experience extracting unit 172, an extraction result storage unit 173, a sensor information acquiring unit 174, an action pattern extracting unit 175, an action/experience checking unit 176, a correspondence relationship storage unit 177, an additional experience searching unit 178 and an action/additional-experience displaying unit 179.

Also, functions of the sensor information acquiring unit 174 and the action pattern extracting unit 175 can be realized using the function of the above action/situation analysis system 10. Also, among the above components held by the information provision system 17, it is possible to freely design components whose functions are held by the information terminals CL and components whose functions are held by the server apparatus SV. For example, it is desirable to design it taking into account the computing power and communication speed of the information terminals CL.

The text information acquiring unit 171 acquires text information input by the user. For example, the text information acquiring unit 171 may denote an input device to input a text by the user or denote an information collection device to acquire text information from social network services or applications. Here, for convenience of explanation, an explanation is given with an assumption that the text information acquiring unit 171 denotes an input unit such as a software keyboard.

The text information acquired by the text information acquiring unit 171 is input in the experience extracting unit 172. At this time, the experience extracting unit 172 may receive an input of the text information together with time information at the time of the input of the text information. When the text information is input, the experience extracting unit 172 analyzes the input text information and extracts information related to user's experiences from the text information. For example, the information related to experiences denotes information including an experienced event (such as an experience type), a place of the experience and the time of the experience. Also, the function of the experience extracting unit 172 is substantially the same as the function of the experience extracting unit 132 according to configuration example #1. The experience-related information extracted from the experience extracting unit 172 is stored in the extraction result storage unit 173.

Meanwhile, the sensor information acquiring unit 174 acquires sensor information from a motion sensor, position sensor or the like. The sensor information acquired by the sensor information acquiring unit 174 is input in the action pattern extracting unit 175. The action pattern extracting unit 175 extracts an action pattern from the input sensor information. Information of the action pattern extracted by the action pattern extracting unit 175 is input in the action/experience checking unit 176. Also, as an action pattern extraction method, it is possible to apply the same method as the above action pattern extraction method by the action/situation analysis system 10.

When the information of the action pattern is input, the action/experience checking unit 176 refers to correspondence relationships between action patterns and experiences, which are stored in the correspondence relationship storage unit 177, and extracts an experience corresponding to the action pattern indicated by the input information. For example, as illustrated in FIG. 25, the correspondence relationship storage unit 177 stores experiences in association with action patterns. As described above, an action pattern is acquired from sensor information. Meanwhile, experience information is acquired from text information. A method of acquiring the action pattern and the experience information is substantially the same as above configuration example #1.

Information of the experience extracted by the action/experience checking unit 176 and information of the action pattern corresponding to the experience are input in the additional experience searching unit 178. When the experience information is input, the additional experience searching unit 178 refers to the extraction result storage unit 173 and searches the same experience as the experience indicated by the input information. As a result of the search, when the same experience as the experience indicated by the input information is detected, the additional experience searching unit 178 extracts text information corresponding to the detected experience and information related to the experience (such as an experience type, experience place, experience time and experience target). For example, by the additional experience searching unit 178, it is possible to acquire information related to experiences as illustrated in FIG. 26.

Figure 27:
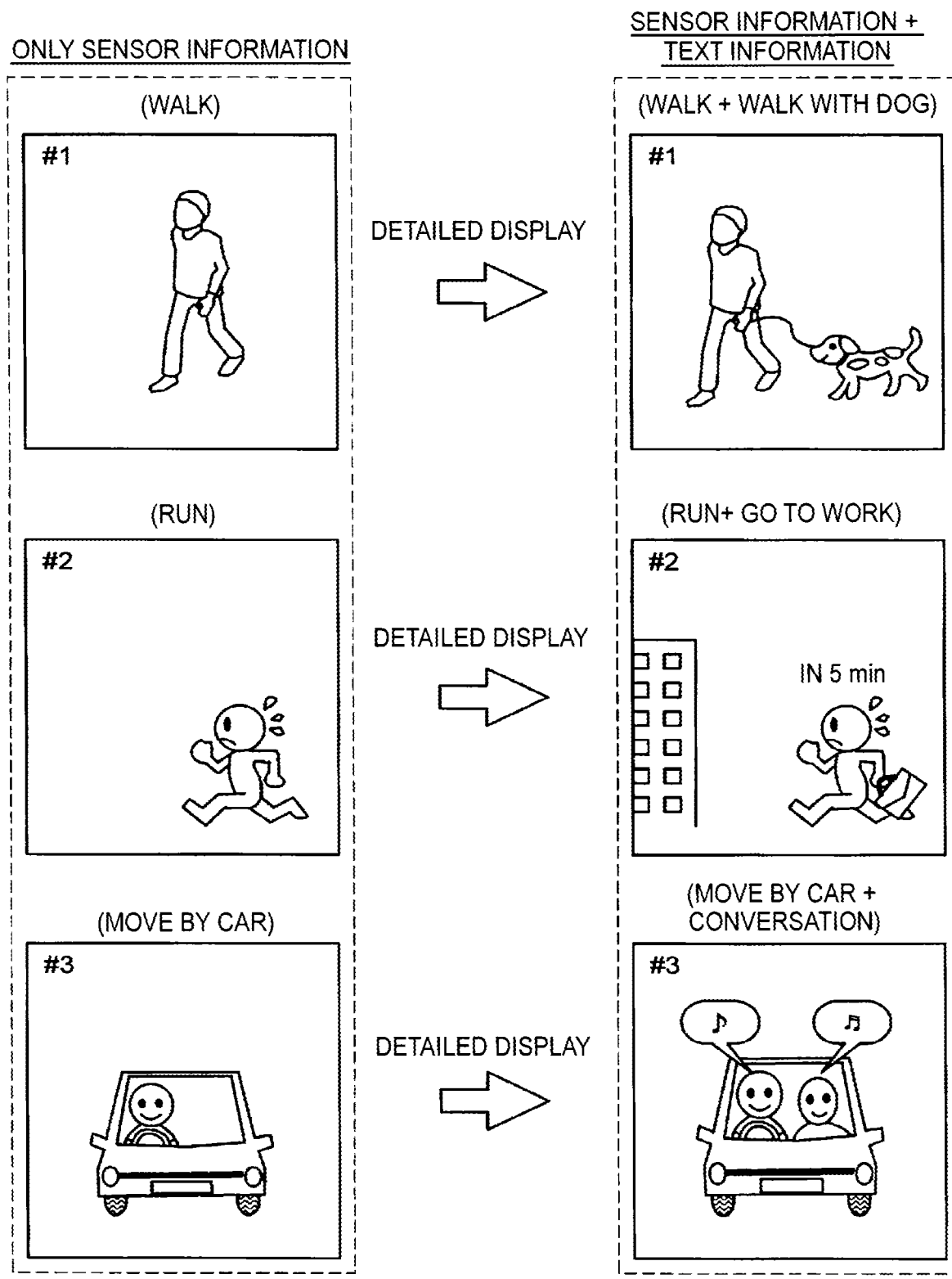
FIG. 27 is an explanatory diagram for explaining details of a function of an information provision system according to configuration example #2.

The search result in the additional experience searching unit 178 is input in the action/additional-experience displaying unit 179. When the search result is input, the action/additional-experience displaying unit 179 displays information related to the experience based on the input search result. For example, as illustrated in FIG. 27, the action/additional-experience displaying unit 179 displays information related to action patterns and experiences. FIG. 27 illustrates the case of displaying action pattern information acquired at the time of using only sensor information, together with the case of displaying action pattern information and experience information acquired at the time of using sensor information and text information. When the text information is used in addition to the sensor information, since it is possible to acquire detailed information related to experiences as illustrated in FIG. 27, it is possible to display the detailed information.

In the case of case #1, it is possible to display only an object corresponding to action pattern "walking" only by sensor information, but, when text information is additionally used, it is possible to display an object related to a "dog" which is an action target. In the case of case #2, although it is possible to display only an object corresponding to action pattern "running" only by sensor information, but, when text information is additionally used, it is possible to display an object related to a "shrine" which is an experience target.

Further, in the case of case #3, although it is possible to display only an object corresponding to action pattern "getting in a car" only by sensor information, but, when text information is additionally used, it is possible to display an object related to experience type "conversation" and experience place "car." Also, although a method of additionally using text information has been illustrated, since it is possible to specify experience type "conversation" and experience place "car" even by using sound information, it is possible to realize the similar detailed display by additionally using sound information. Also, when a sound recognition technique is used, since it is possible to convert sound signals into text information, it is possible to realize the detailed display as illustrated in FIG. 27 by the similar method.

The configuration of the information provision system 17 according to configuration example #2 has been explained above. Here, in the above explanation, although an explanation has been given along a flow of processing to analyze text information first and analyze sensor information later, the order of analysis processing may be reverse. Also, a report method of detailed information may be audio guidance instead of screen display. Such alternation naturally belongs to the technical scope of the present embodiment too.

2-3-2: Flow of Processing

Figure 28:
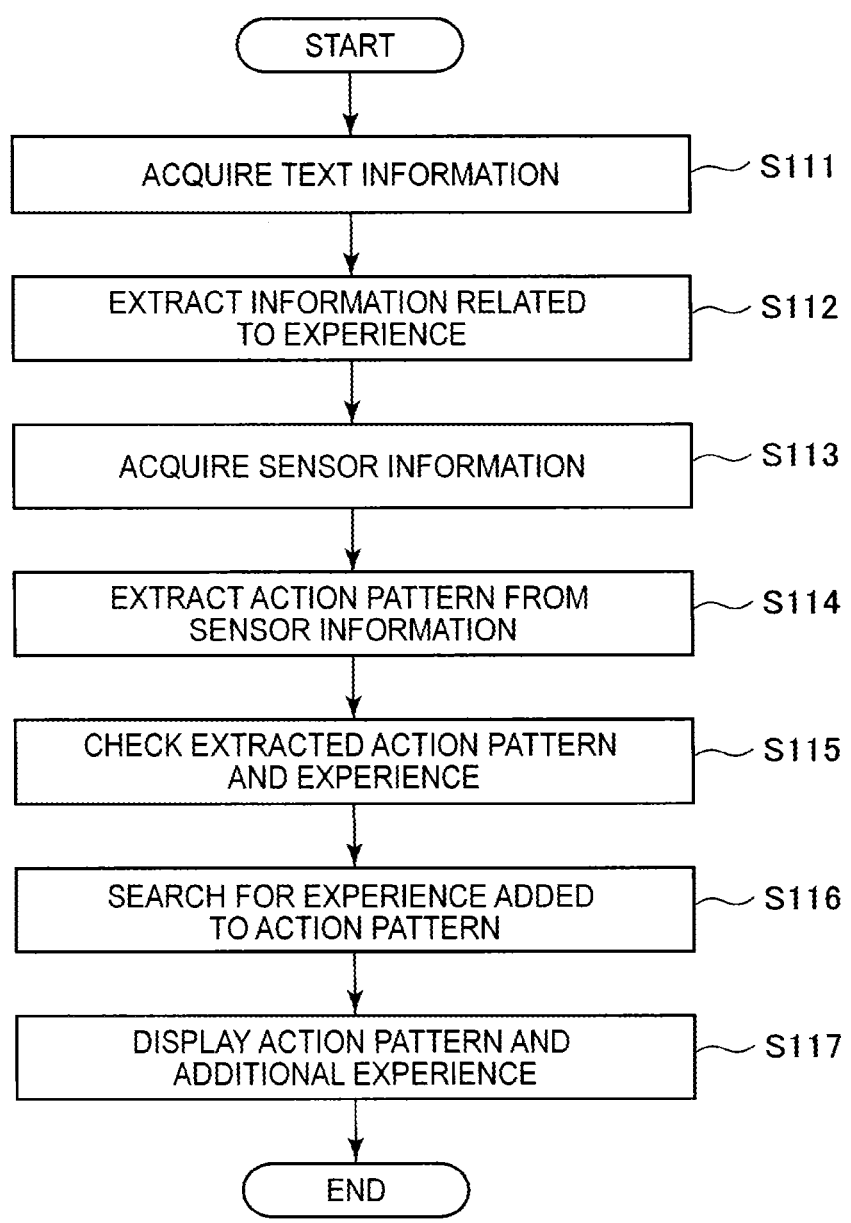
FIG. 28 is an explanatory diagram for explaining an operation of an information provision system according to configuration example #2.

Next, with reference to FIG. 28, a flow of processing performed by the information provision system 17 is explained. FIG. 28 is an explanatory diagram for explaining a flow of processing performed by the information provision system 17. Also, the order of part of the processing steps illustrated in FIG. 28 may be changed. For example, the order of a processing step related to text information analysis and the order of a processing step related to sensor information analysis may be switched.

As illustrated in FIG. 28, first, the information provision system 17 acquires text information by the function of the text information acquiring unit 171 (S111). Next, the information provision system 17 extracts information related to experiences, from the text information, by the function of the experience extracting unit 172 (S112). Next, the information provision system 17 acquires sensor information by the function of the sensor information acquiring unit 174 (S113). Next, the information provision system 17 extracts an action pattern from the sensor information by the function of the action pattern extracting unit 175 (S114).

Next, the information provision system 17 checks the action pattern extracted in step S114 against the experiences by the function of the action/experience checking unit 176, and extracts information of an experience corresponding to the action pattern (S115). Next, the information provision system 17 extracts experience-related information corresponding to the experience extracted in step S115, from information related to the experiences extracted in step S112, by the function of the additional experience searching unit 178 (S116). Next, the information provision system 17 displays information corresponding to the action pattern extracted from the sensor information, together with information corresponding to the experience-related information extracted in step S116, by the function of the action/additional-experience displaying unit 179 (S117), and finishes a series of processing.

The flow of processing performed by the information provision system 17 has been explained above.

2-3-3: Example of Screen Display

In the following, a display method of detailed information is supplementarily explained.

As the detailed information display method, there are methods such as cases #1 to #3 in FIG. 27. That is, as an example, there is provided a method of displaying information of an action pattern detected from sensor information, and, in a case where experience-related information with respect to an experience corresponding to the action pattern is acquired from text information, additionally displaying the experience-related information. Also, there is a possible method of additionally displaying time information ("in five minutes") as detailed display like case #2 or additionally displaying conversation content of a fellow passenger as detailed display like case #3. If such detailed display is possible, it is possible to report a state more accurately.

The technique according to configuration example #2 has been explained above.

2-4: Configuration Example #3: (Decision of Ordinary Action or Extraordinary Action)

Next, configuration example #3 is explained. Configuration example #3 relates to a system of deciding an extraordinary action or experience among user's experiences acquired from input information such as action pattern information and text information, and providing it to the user.

2-4-1: Details of System Configuration

Figure 29:
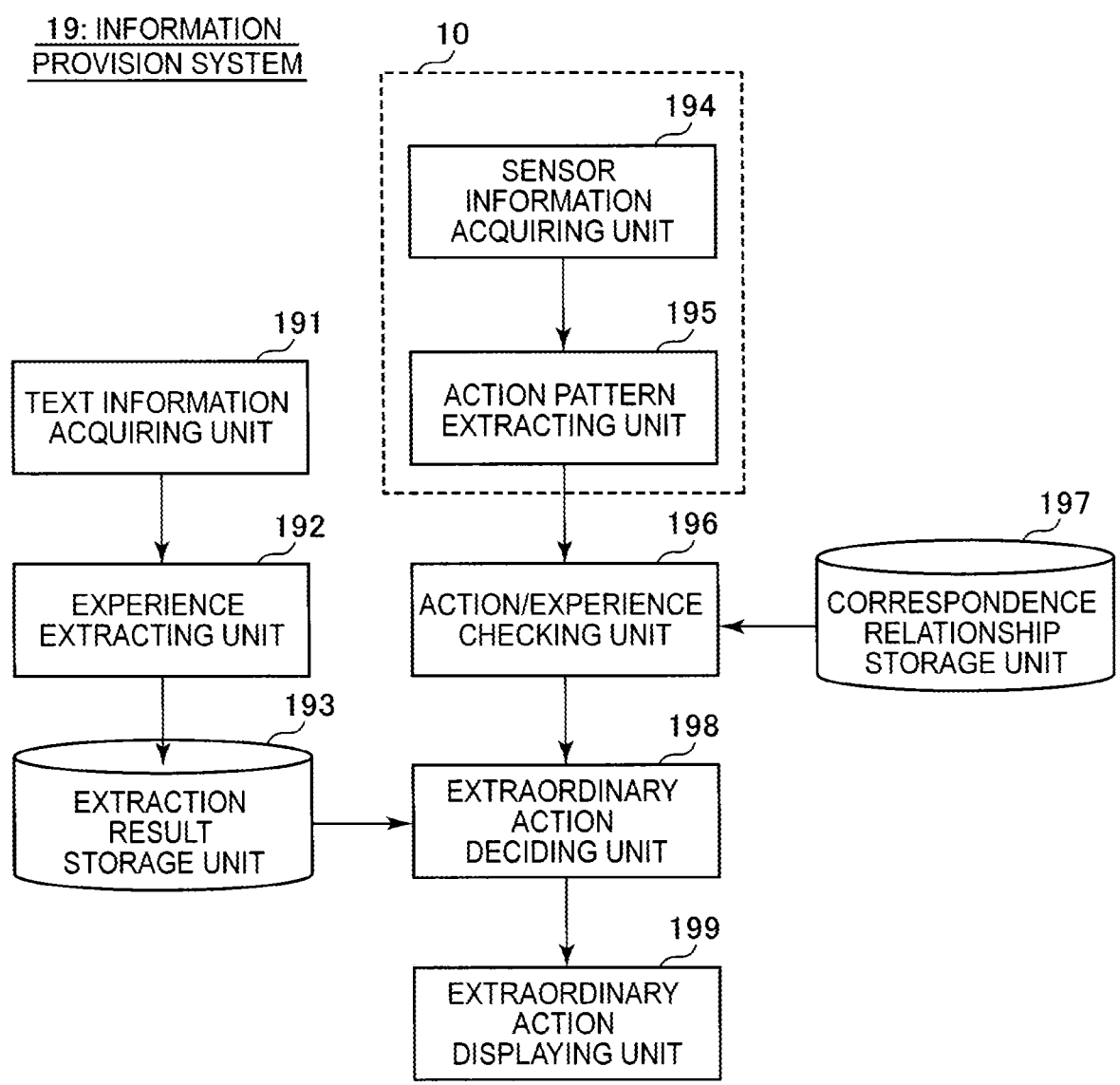
FIG. 29 is an explanatory diagram for explaining a configuration of an information provision system according to configuration example #3.

A system (information provision system 19) according to configuration example #3 is as illustrated in FIG. 29, for example. As illustrated in FIG. 29, the information provision system 19 includes a text information acquiring unit 191, an experience extracting unit 192, an extraction result storage unit 193, a sensor information acquiring unit 194, an action pattern extracting unit 195, an action/experience checking unit 196, a correspondence relationship storage unit 197, an extraordinary action deciding unit 198 and an extraordinary action displaying unit 199.

Also, functions of the sensor information acquiring unit 194 and the action pattern extracting unit 195 can be realized using the function of the above action/situation analysis system 10. Also, among the above components held by the information provision system 19, it is possible to freely design components whose functions are held by the information terminals CL and components whose functions are held by the server apparatus SV. For example, it is desirable to design it taking into account the computing power and communication speed of the information terminals CL.

The text information acquiring unit 191 acquires text information input by the user. For example, the text information acquiring unit 191 may denote an input device to input a text by the user or denote an information collection device to acquire text information from social network services or applications. Here, for convenience of explanation, an explanation is given with an assumption that the text information acquiring unit 191 denotes an input unit such as a software keyboard.

The text information acquired by the text information acquiring unit 191 is input in the experience extracting unit 192. At this time, the experience extracting unit 192 may receive an input of the text information together with time information at the time of the input of the text information. When the text information is input, the experience extracting unit 192 analyzes the input text information and extracts information related to user's experiences from the text information. For example, the information related to experiences denotes information including an experienced event (such as an experience type), a place of the experience and the time of the experience. Also, the function of the experience extracting unit 192 is substantially the same as the function of the experience extracting unit 132 according to configuration example #1. The experience-related information extracted from the experience extracting unit 192 is stored in the extraction result storage unit 193.

Meanwhile, the sensor information acquiring unit 194 acquires sensor information from a motion sensor, position sensor or the like. The sensor information acquired by the sensor information acquiring unit 194 is input in the action pattern extracting unit 195. The action pattern extracting unit 195 extracts an action pattern from the input sensor information. Information of the action pattern extracted by the action pattern extracting unit 195 is input in the action/experience checking unit 196. Also, as an action pattern extraction method, it is possible to apply the same method as the above action pattern extraction method by the action/situation analysis system 10.

When the information of the action pattern is input, the action/experience checking unit 196 refers to correspondence relationships between action patterns and experiences, which are stored in the correspondence relationship storage unit 197, and extracts an experience corresponding to the action pattern indicated by the input information. For example, as illustrated in FIG. 25, the correspondence relationship storage unit 197 stores experiences in association with action patterns. As described above, an action pattern is acquired from sensor information. Meanwhile, experience information is acquired from text information. A method of acquiring the action pattern and the experience information is substantially the same as above configuration example #1.

Information of the experience extracted by the action/experience checking unit 196 and information of the action pattern corresponding to the experience are input in the extraordinary action deciding unit 198. When the action pattern information is input, the extraordinary action deciding unit 198 decides whether the input action pattern information indicates an extraordinary action. Also, when the experience information is input, the extraordinary action deciding unit 198 decides whether the input experience information indicates an extraordinary experience.

For example, the extraordinary action deciding unit 198 decides an extraordinary action and an extraordinary experience based on extraordinary conditions as illustrated in FIG. 30.

In the example in FIG. 30, in the case of (extraordinary #1), the extraordinary action deciding unit 198 decides whether a time zone abnormity occurs in an action pattern extracted from sensor information. That is, in a case where an action of a certain type is extracted in a time zone different from a time zone in which it is ordinarily extracted or in a case where it is not extracted in all time zones, the extraordinary action deciding unit 198 decides the action as an extraordinary action. To be more specific, regarding a user for which a "walking" action is ordinarily extracted in the morning and evening, in a case where the "walking" action is extracted at midnight, the "walking" action at midnight is decided as an extraordinary action.

Also, in the case of (extraordinary #2), the extraordinary action deciding unit 198 decides whether a type abnormity occurs in an action pattern extracted from sensor information. That is, in a case where an action of a different type from the type of an action that is ordinarily extracted is extracted in a certain time zone, the extraordinary action deciding unit 198 decides the action as an extraordinary action. To be more specific, regarding a user for which a "walking" action or a "train" action is ordinarily extracted in the morning, in a case where a "running" action or a "bicycle" action is extracted, the "running" action and the "bicycle" action are decided as an extraordinary action.

Also, in the case of (extraordinary #3), the extraordinary action deciding unit 198 decides whether a time zone abnormity occurs in an experience extracted from text information. That is, in a case where an experience of a certain type is extracted in a time zone different from a time zone in which it is ordinarily extracted or in a case where it is not extracted in all time zones, the extraordinary action deciding unit 198 decides the experience as an extraordinary action. To be more specific, regarding a user for which an "eating" experience is extracted in the morning, afternoon and evening, in a case where the "eating" experience is extracted at midnight or in a case where the "eating" experience is not extracted in the afternoon, the corresponding experience is decided as an extraordinary action.

Also, in the case of (extraordinary #4), the extraordinary action deciding unit 198 decides whether a type abnormity occurs in an experience extracted from text information. That is, in a case where an experience of a different type from the type of an experience that is ordinarily extracted is extracted in a certain time zone, the extraordinary action deciding unit 198 decides the experience as an extraordinary action. To be more specific, regarding a user for which an "eating" experience is ordinarily extracted in the afternoon, in a case where a "running" experience is detected in the afternoon, the "running" experience is decided as an extraordinary action.

FIG. 29 is referred to again. As described above, an extraordinary action decision result by the extraordinary action deciding unit 198 is input in the extraordinary action displaying unit 199. The extraordinary action displaying unit 199 highlights an object or text corresponding to an extraordinary action or displays a new object indicating an extraordinary action.

The configuration of the information provision system 19 according to configuration example #3 has been explained above. Here, in the above explanation, although an explanation has been given along a flow of processing to analyze text information first and analyze sensor information later, the order of analysis processing may be reverse. Also, although an explanation has been given using a processing example to decide the ordinary/extraordinary, it is possible to similarly form a system to decide a positive action or negative action. Such alternation naturally belongs to the technical scope of the present embodiment too.

2-4-2: Application Example

Although extraordinary action decision logic is specifically illustrated in FIG. 30, by deciding an ordinary action or extraordinary action in this way, it is possible to estimate user's health status or detailed state. For example, in the case of (extraordinary #1) illustrated in FIG. 30, since a midnight action that is not ordinarily extracted is extracted, insomnia may be estimated. Although conditions are simplified for convenience of explanation in the example in FIG. 30, for example, if a "catnap" action is extracted during the day, the late hours or life rhythm disturbance is estimated as the reason. By further adding conditions, it can be used to the diagnosis of health status such as insomnia.

Similarly, in the example of (extraordinary #2), as a reason of the extraordinary action, a challenge to dieting during commute time may be estimated. Also, in the example of (extraordinary #3), busyness at work is simply estimated as a reason of the extraordinary action. Further, in the example of (extraordinary #4), as a reason of the extraordinary action, a challenge to dieting by skipping lunch may be estimated. By combining extraordinary actions, it is possible to improve the reason estimation accuracy. Also, from a history or statistical result of extraordinary actions based on sensor information and text information, it is effective to improve extraordinary conditions or form a reason estimation algorithm. Thus, the technique according to the present embodiment is variously applicable.

The technique according to configuration example #3 has been explained above.

2-5: Regarding Combination of Configuration Examples

It is possible to arbitrarily combine the techniques according to above configuration examples #1 to #3. Since the technique of extracting experience-related information from text information and the technique of extracting an action pattern from sensor information are common, it is possible to arbitrarily combine part of all of configuration examples #1 to #3 by connecting other function blocks in series or parallel. Also, in the case of combining multiple configuration examples, by making a design to share a function block having a common function, an effect of processing load reduction or memory usage reduction is estimated. Such a combination configuration naturally belongs to the technical scope of the present embodiment too.

3: EXAMPLE HARDWARE CONFIGURATION

Functions of each constituent included in the action/situation analysis system 10, the information provision systems 13, 17, and 19, the information terminal CL, and the server apparatus SV described above can be realized by using, for example, the hardware configuration of the information processing apparatus shown in FIG. 31. That is, the functions of each constituent can be realized by controlling the hardware shown in FIG. 31 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handy-phone System. Also, the PDA is an abbreviation for Personal Digital Assistant.

As shown in FIG. 31, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is a mechanism for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE 1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a modem for various communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

4: CONCLUSION

Finally, the technical idea of the present embodiment is simply summarized. The technical idea described below is applicable to various information processing apparatuses such as a PC, a mobile phone, a portable game device, a portable information terminal, an information appliance and a car navigation.

Additionally, the present technology may also be configured as below.
1. An information processing apparatus including:
   a matter extracting unit extracting a predetermined matter from text information;
   an action pattern specifying unit specifying one or multiple action patterns associated with the predetermined matter;
   an action extracting unit extracting each of the action patterns associated with the predetermined matter, from sensor information; and
   a state analyzing unit generating state information indicating a state related to the predetermined matter, based on each of the action patterns extracted from the sensor information, using a contribution level indicating a degree of contribution of each of the action patterns to the predetermined matter, for a combination of the predetermined matter and each of the action patterns associated with the predetermined matter.

(2) The information processing apparatus according to (1), further including:

a state displaying unit displaying the state information generated by the state analyzing unit.

(3) The information processing apparatus according to (1) or (2), further including:

a sensor information acquiring unit acquiring sensor information detected by a sensor mounted on a terminal apparatus held by a user; and a text information acquiring unit acquiring text information input by the user, wherein the matter extracting unit extracts the predetermined matter from the text information acquired by the text information acquiring unit, and wherein the action extracting unit extracts the action patterns from the sensor information acquired by the sensor information acquiring unit.

(4) The information processing apparatus according to (2), wherein the state displaying unit displays the state information on a display unit of a terminal apparatus held by a user.

(5) The information processing apparatus according to any one of (1) to (4), wherein the state information includes at least one of an attainment level indicating, in a case where the predetermined matter is a matter desired to be attained, a current attainment level with respect to the matter, a current value related to a current state of the predetermined matter, which is acquired from the action patterns associated with the predetermined matter, and a comparison value obtained by comparing the current value related to the current state of the predetermined matter and a past value related to a past state of the predetermined matter, the comparison value being a value acquired from the action patterns associated with the predetermined matter.

(6) The information processing apparatus according to any one of (3) to (5), wherein, in a case where the predetermined matter is a matter desired to be attained, the state information is an attainment level indicating a current attainment level with respect to the matter, and wherein the information processing apparatus further includes:

an effort tendency reporting unit deciding whether an effort is made to attain the matter desired to be attained, according to an increase tendency or a decrease tendency of the attainment level, and presenting a decision result to a user.

(7) The information processing apparatus according to any one of (3) to (6), wherein, in a case where the predetermined matter is a matter desired to be attained the state information is an attainment level indicating a current attainment level with respect to the matter, and wherein the information processing apparatus further includes:

a cause reporting unit presenting, to a user, an action pattern of high frequency among action patters that have previously provided negative contribution levels or a histogram of the action patterns that have previously provided negative contribution levels in a case where the attainment level is below a predetermined threshold.

(8) The information processing apparatus according to any one of (3) to (7), wherein, in a case where the predetermined matter is a matter desired to be attained, the state information is an attainment level indicating a current attainment level with respect to the matter, and wherein the information processing apparatus further includes:

an advice reporting unit presenting, to a user, an action pattern having an opposite tendency to an action patter of high frequency among action patterns that have previously provided negative contribution levels in a case where the attainment level is below a predetermined threshold.

(9) The information processing apparatus according to (1) or (2), further including:

a sensor information acquiring unit acquiring sensor information detected by a sensor mounted on a terminal apparatus attached to a mobile object; and a text information acquiring unit acquiring text information input by a user who manages the mobile object, wherein the matter extracting unit extracts the predetermined matter from the text information acquired by the text information acquiring unit, and wherein the action extracting unit extracts the action patterns from the sensor information acquired by the sensor information acquiring unit.

(10) An information processing method including:

extracting a predetermined matter from text information;

specifying one or multiple action patterns associated with the predetermined matter;

extracting each of the action patterns associated with the predetermined matter, from sensor information; and generating state information indicating a state related to the predetermined matter, based on each of the action patterns extracted from the sensor information, using a contribution level indicating a degree of contribution of each of the action patterns to the predetermined matter, for a combination of the predetermined matter and each of the action patterns associated with the predetermined matter.

(11) A program for causing a computer to realize:

a matter extracting function of extracting a predetermined matter from text information;

an action pattern specifying function of specifying one or multiple action patterns associated with the predetermined matter;

an action extracting function of extracting each of the action patterns associated with the predetermined matter, from sensor information; and a state analyzing function of generating state information indicating a state related to the matter, based on each of the action patterns extracted from the sensor information, using a contribution level indicating a degree of contribution of each of the action patterns to the predetermined matter, for a combination of the predetermined matter and each of the action patterns associated with the predetermined matter.

(12) An information processing apparatus including:

an experience extracting unit extracting experience information indicating a user experience from text information;

an action extracting unit extracting an action pattern from sensor information;

a correspondence experience extracting unit extracting, based on relationship information indicating a correspondence relationship between the experience information and the action pattern, experience information corresponding to the action pattern extracted from the sensor information; and a display controlling unit displaying information related to the experience information extracted from the text information along with information related to the experience information corresponding to the action pattern.

(13) The information processing apparatus according to (12), wherein the experience extracting unit extracts information of at least one of an experience type, an experience place, an experience time and an experience target, from the text information, as the experience information.

(14) The information processing apparatus according to (12) or (13), wherein the display controlling unit displays the information related to the experience information corresponding to the action pattern extracted from the sensor information, and, in a case where a user performs an operation of detailed display, displays the information related to the experience information extracted from the text information.

(15) The information processing apparatus according to any one of (12) to (14), further including:
a sensor information acquiring unit acquiring sensor information detected by a sensor mounted on a terminal apparatus held by a user; and
a text information acquiring unit acquiring text information input by the user,
wherein the experience extracting unit extracts the experience information from the text information acquired by the text information acquiring unit, and
wherein the action extracting unit extracts the action pattern from the sensor information acquired by the sensor information acquiring unit.

(16) The information processing apparatus according to any one of (12) to (15), further including:
an extraordinary action deciding unit deciding whether the action pattern extracted from the sensor information is extraordinary.

(17) The information processing apparatus according to (16), wherein the extraordinary action deciding unit further decides whether the experience information extracted from the text information is extraordinary.

(18) The information processing apparatus according to (16) or (17), wherein, in a case where the extraordinary action deciding unit decides that the experience information extracted from the text information is extraordinary, the display controlling unit highlights information related to experience information corresponding to a result of the decision.

(19) The information processing apparatus according to any one of (16) to (18), wherein the extraordinary action deciding unit decides an action corresponding to experience information extracted in a time zone different from a time zone that is ordinarily extracted, or an action corresponding to experience information that is not extracted in both time zones, as an extraordinary action.

(20) The information processing apparatus according to any one of (16) to (18), wherein the extraordinary action deciding unit decides an action corresponding to experience information of a type different from a type of an experience that is ordinarily extracted, as an extraordinary action.

(21) An information processing method including:
extracting experience information indicating a user experience, from text information;
extracting an action pattern from sensor information;
extracting, based on relationship information indicating a correspondence relationship between the experience information and the action pattern, experience information corresponding to the action pattern extracted from the sensor information; and
displaying information related to the experience information extracted from the text information along with information related to the experience information corresponding to the action pattern.

(21) A program causing a computer to realize:
an experience extracting function of extracting experience information indicating a user experience, from text information;
an action extracting function of extracting an action pattern from sensor information;
a correspondence experience extracting function of extracting, based on relationship information indicating a correspondence relationship between the experience information and the action pattern, experience information corresponding to the action pattern extracted from the sensor information; and
a display controlling function of displaying information related to the experience information extracted from the text information along with information related to the experience information corresponding to the action pattern.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

What is claimed is:

1. An information processing apparatus, comprising:
circuitry configured to
determine a goal or declaration related to an experienced event defined in a social media content information,
extract action data of a user, with regard to the goal or declaration based on motion data received from a motion sensor,
calculate an update value of an attainment level with regard to the goal or declaration based on the action data related to the experienced event,
update the attainment level to a current attainment level based on the update value, and
control a display to display the current attainment level for the goal or declaration as a result of the update value.

2. The information processing apparatus according to claim 1, wherein the attainment level is retrieved by comparing the current attainment level to the goal or declaration.

3. The information processing apparatus according to claim 1, wherein the attainment level indicates a comparison between the current attainment level and a past attainment level.

4. The information processing apparatus according to claim 1, wherein a contribution level is associated the goal or declaration and the action data.

5. The information processing apparatus according to claim 4, wherein the circuitry is further configured to calculate the update value in real-time based on detection of the action data.

6. The information processing apparatus according to claim 4, wherein the circuitry is further configured to present the current attainment level via an object acquired as a result of taking the action data.

7. The information processing apparatus according to claim 4, wherein the circuitry is further configured to present the current attainment level via an object acquired as a result of taking the action data.

8. The information processing apparatus according to claim 1, wherein the circuitry is further configured to calculate the update value in real time based on detection of the action data.

9. The information processing apparatus according to claim 1, wherein the circuitry is further configured to present the current attainment level visually, audibly, haptically, and blinkingly.

10. The information processing apparatus according to claim 1, wherein the circuitry is further configured to reflect a numerical value with respect to the action data to the current attainment level.

11. The information processing apparatus according to claim 1, wherein the circuitry is further configured to further presents advice information on how to attain the goal or declaration.

12. The information processing apparatus according to claim 1, wherein the circuitry is further configured to reflect a numerical value with respect to the action data to the current attainment level.

13. An information processing apparatus, comprising:

circuitry configured to determine a goal or declaration related to an experienced event defined in a social media content information, extract action data of a user, with regard to the goal or declaration based on motion data received from a motion sensor, calculate update value of the attainment level with regard to the goal or declaration based on the action data related to the experienced event, and update current attainment level based on the updated value, and present the current attainment level for the goal or declaration as a result of the updated value.

* * * * *